(12) United States Patent
Pflanz

(10) Patent No.: US 7,178,337 B2
(45) Date of Patent: Feb. 20, 2007

(54) POWER PLANT SYSTEM FOR UTILIZING THE HEAT ENERGY OF GEOTHERMAL RESERVOIRS

(76) Inventor: Tassilo Pflanz, Lutzstr. 8, 80687 München (DE)

( * ) Notice: Subject to any disclaimer, the term of this patent is extended or adjusted under 35 U.S.C. 154(b) by 0 days.

(21) Appl. No.: 11/019,216

(22) Filed: Dec. 23, 2004

(65) Prior Publication Data

US 2006/0137349 A1 Jun. 29, 2006

(51) Int. Cl.
*F03G 7/00* (2006.01)
(52) U.S. Cl. .................................... 60/641.2
(58) Field of Classification Search .............. 60/641.2, 60/641.3, 641.4, 641.5
See application file for complete search history.

(56) References Cited

U.S. PATENT DOCUMENTS

| | | | |
|---|---|---|---|
| 3,677,008 A | | 7/1972 | Koutz |
| 4,078,610 A | * | 3/1978 | Arnold ............... 166/280.1 |
| 4,132,077 A | * | 1/1979 | Johnson ................ 60/649 |
| 4,147,204 A | | 4/1979 | Pfenninger |
| 4,161,657 A | * | 7/1979 | Shaffer, Jr. ............. 290/1 R |
| 5,512,787 A | * | 4/1996 | Dederick ............... 290/4 R |
| 5,661,977 A | * | 9/1997 | Shnell ................. 60/641.2 |
| 5,941,238 A | * | 8/1999 | Tracy ................. 126/641 |
| 6,100,600 A | | 8/2000 | Pflanz .................. 290/54 |
| 6,233,951 B1 | * | 5/2001 | Cardill ................. 62/81 |
| 6,523,347 B1 | * | 2/2003 | Jirnov et al. ............ 60/651 |
| 2005/0000802 A1 | * | 1/2005 | Hobbs .................. 204/277 |

FOREIGN PATENT DOCUMENTS

| | | |
|---|---|---|
| DE | 19742677 A1 | 4/1999 |
| DE | 198 21 659 | 11/1999 |
| DE | 101 21 475 | 11/2002 |

OTHER PUBLICATIONS

T. Pflanz: "Maritime Kraftwerksanlage mit Herstellungsprozeβ zur Gewinnung, Speicherung und zum Verbrauch von regenerativer Energie"; Proceedings PE2.5, The World Wind Energy Conference and Exhibition, Berlin, Germany, Jul. 2-6, 2002; ISBN 3-936338-11-6.

C.J. Winter et al.: "Wasserstoff als Energieträger"; Technik, System, Wirtschaft; pp. 178, 180, 1986, Springer Verlag, Berlin, Germany.

F. Crotogino: "Druckluftspeicher-Gasturbinen-Kraftwerke / Geplanter Einsatz beim Ausgleich fluktierender Windenergieproduktion und aktuellem Strombedarf"; Proceedings 2002, pp. 26-38; 7th Kasseler Symposium Energie—Systemtechnik; Institut für Solare Energieversorgungstechnik; Kassel, Germany.

(Continued)

*Primary Examiner*—Hoang Nguyen
(74) *Attorney, Agent, or Firm*—Gudrun E. Huckett

(57) ABSTRACT

A geothermal power plant system for producing electricity and process heat at least one compressed gas storage device and at least one gas compression device connected to the at least one compressed gas storage device. At least one gas utilization device is connected to the at least one compressed gas storage device. At least one device for utilizing renewable energy such as of solar energy, wind energy, hydropower, ocean thermal energy, ocean waves, ocean current and tidal current, ambient heat or cold is provided.

27 Claims, 14 Drawing Sheets

OTHER PUBLICATIONS

Rainer Knorr: "Einsatz von Superkondensatoren in Kraftfahrzeugen"; Proceedings 2002, pp. 150-161; 7th Kasseler Symposium Energie—Systemtechnik; Institut für Solare Energieversorgungstechnik; Kassel, Germany.

Klaus-Peter Juengst: "Supraleitende Magnetische Energiespeicher"; Proceedings 2002, pp. 162-177; 7th Kasseler Symposium Energie—Systemtechnik; Institut für Solare Energieversorgungstechnik; Kassel, Germany.

Frank Täubner: "Schwungradspeicher—Stand der Technik"; Proceedings 2002, pp. 178-188; 7th Kasseler Symposium Energie—Systemtechnik; Institut für Solare Energieversorgungstechnik; Kassel, Germany.

Norbert Auner: "Silizium—Der neue Wasserstoff?" Proceedings 2001, pp. 7-15; 6th Kasseler Symposium Energie—Systemtechnik; Institut für Solare Energieversorgungstechnik; Kassel, Germany.

Martin Kaltschmidt et al: "Energie aus Erdwärme"; pp. 34, 40, 88-95; 208; 212, 214; 1999; Deutscher Verlag für Grundstoffindustrie, Stuttgart, Germany.

K. Heinloth: "Energie—Physikalische Grundlagen ihrer Gewinnung, Umwandlung und Nutzung", pp. 150-155; 1983; B. G. Teubner Verlag, Stuttgart, Grermany.

William H. Avery et al.: "Renewable Energy from the Ocean, a guide to OTEC", pp. 3-7, 210-211, 1994, Oxford University Press, Oxford, United Kingdom.

Konstantin Ledjeff: "Brennstoffzellen: Entwicklung Technologie, Anwendung"; p. 30; 1995; C.F. Miller Verlag GmbH, Heidelberg, Germany.

F. Crotogino et al: "Huntorf CAES: More than 20 Years of Successful Operation"; Apr. 15-18, 2001, Proceedings, Spring 2001 Meeting Orlando, Florida, USA.

\* cited by examiner

POWER PLANT SYSTEM FOR UTILIZING THE HEAT ENERGY OF GEOTHERMAL RESERVOIRS

BACKGROUND OF THE INVENTION

The invention relates to a power plant system for utilizing the heat energy of a geothermal reservoir in combination with processes for generating and storing additional renewable forms of energy. The power plant system can be an individual system or can be operated in a network.

A plurality of possibilities for generating electricity from renewable forms of energy are known. The following systems are built primarily as onshore devices: wind power plants, run-of-river power plants, hydroelectric power plants at reservoirs, devices for utilizing ocean and tidal currents, devices for recovery of ocean thermal energy, photovoltaic devices, power plants with mirror systems as radiation concentrators such as parabolic trough systems, solar chimney power plants, combined heat and power plants operated with bio gas or hydrogen, and geothermal heating devices. In the offshore field, increasingly wind power plants, ocean wave devices, and ocean current devices are also erected more and more.

Ocean current energy and tidal energy are fluctuating forms of energy. However, because of their periodicity, they are easily predictable and therefore planning is possible. A large consumer could be adjusted with regard to its operation. On the other hand, solar radiation, wind energy, and ocean wave energy are weather-dependent forms of energy that can be predicted only with the usual uncertainty. When directly connecting these devices to the electrical power system, it is necessary in the case of deviation of the generated electricity from the actual demand to either run up power plants using fossil fuel in order to compensate the deficiency or, when an oversupply of renewable energy is present, to throttle them.

However, these fossil fuel operated power plants are not operated at optimal working point and optimal efficiency when operated in compensating operation for fluctuating sources. In comparison to the optimal operation, for each electrical energy unit more $CO_2$ is produced and more fuel is required. Accordingly, higher costs result in comparison to continuous operation of the power plant at the optimal working point. For this reason, the operation of power plants supplied with fossil fuels in order to enable compensation of fluctuating forms of energy, in turn, limits the environmentally friendly generation of energy of regenerative power plants.

In [1] and [2] an ocean power plant concept for use in the ocean or in a coastal area having great water depths is described that uses exclusively regenerative forms of energy. In this power plant concept at least two, if possible all, regenerative energy flows available at the site are to be used. For example, when one regenerative form of energy is not available, it can be replaced by another at the same time.

When a direct connection to an electrical power system is not possible, the energy that is generated at the site is to be consumed directly by a manufacturing process and is to be stored in this way. There are very different manufacturing processes, from foodstuff production to the production of known energy carriers to processing of metals. The product of a manufacturing process is then transported by ship, or if technically possible and economical, by pipelines to a storage facility in the vicinity of the consumer. With the aid of storage devices, an energy-consuming power system becomes independent of the arrival of regenerative energy in this way. The supply on land is always ensured because the manufactured products can be always optimally adjusted by suitable storage and distribution to the actual demand.

The power plant disclosed in [1] and [2] propose utilization of warm surface water that has a temperature differential relative to the cold water at approximately 800 m depth. For a sufficiently great temperature differential it is possible to take work-performing energy from a heat flow. Far away from 40 degree latitude in the northern or southern direction, the temperature differential between surface water and deep water is too minimal so that it cannot be economically used. Because of the required large ocean depth for the cold water, this concept therefore cannot be used in warm shallow seas whose depths do not reach at least 700 m to 800 m.

The described submarine reverse osmosis requires a minimum depth of approximately 300 m to 500 m in order to be able to operate especially economically in comparison to other desalination methods. When the water depth is less, additional energy must be made available for the required pressure build-up for reverse osmosis. The reverse osmosis is still an interesting method for desalinating sea water. Drinking water preparation and desalination of water are very important but also energy-intensive processes that gain in importance. The public becomes more and more aware of the worldwide depletion of drinking water.

In shallow seas such as the North Sea, the concepts disclosed in [1] and [2] can use only ocean waves, ocean and tidal currents, wind and solar radiation. The disclosed concepts of ocean thermal energy recovery by utilizing warm surface water and cold deep water is not possible in this connection.

Since however installation sites for regenerative energy devices on densely populated land decrease further, for example, by utilizing the already present suitable areas for wind energy or because of political resistance against wind power and biogas devices, it is necessary to utilize increasingly shallow sea areas near the coast.

Since the division of the shallow seas such as the North Sea by the adjoining countries into zones, oil and natural gas deposits and other possibly present natural resources can be used only by the countries to which the zone is assigned. Since approximately 1970, the shallow seas such as the North Sea are intensively industrially used and the fossil energy deposits have been exploited largely since. The accidents that occur during exploration and distribution of oil lead to significant contamination of the sea water and entire coastal areas (see current newspaper). The coastal countries that are not participating in extraction of oil and natural gas must suffer involuntarily the disadvantages and must cover the resulting high costs.

When directly connecting power plant systems that utilize different forms of renewable energy such as wind or solar radiation, there are significant deviations between generation and consumption. If it is desired to no longer use fossil fuel operated power plants for compensation, it is necessary to provide storage devices connected to the power system.

For storage purposes, concepts that produce electrolytically hydrogen with electricity derived from renewable forms of energy and convert hydrogen in fuel cells or in gas-combusting turbines to electricity are obvious and have been known for some time [3].

The disclosure in [4; see pages 26ff] describes the combination of a compressed air storage device with a natural gas turbine power plant in connection with wind energy devices. When a large supply of electricity from wind energy is present while electrical consumption through the power system is low, the oversupply is used for operating an air compressor unit. The compressed air is stored in an underground cavity such as salt cavern. The compressed air storage is thus the equivalent of a pumped storage power plant. When the demand for electricity is greater than the supply derived from wind energy, the compressed air and the natural gas are burned together in a turbine. The energy potential that is stored in the compressed air, after subtracting the conversion losses, can thus be used again and can be made available already within a short period of time. Such a device is capable of providing electrical compensation and regulating energy within less than 15 minutes. These storage contents are sufficient for a removal lasting several hours up to several days, depending on the configuration of the storage device.

In regard to this concept for air compression, there is presently no solution for use of the occurring heat loss that results during compression. In order to still enable an efficient use of compressed air, a combination with the gas turbine is therefore viewed as beneficial. The combination of the compressed air storage device with a gas-fueled combustion turbine in connection with wind energy devices enables a significant reduction of the $CO_2$ emission. However, fossil fuel, that is available only in limited quantities and whose combustion leads to pollutants such as $NO_x$ and $CO_2$ released into the environment, is still used.

For a very fast storage of electrical energy (within the millisecond range up to several hundred seconds), electric coil banks and capacitor banks, used for reactive power compensation, have been known for a long time. The magnetic storage device with supra-conducting coils [4, pages 162ff] is further developed in research and new high-performance capacitors [4, pages 150ff] are being tested today in connection with small applications such as flashlights with solar cells to the use in automobiles for the recovery of energy. Rechargeable electric battery systems (electrochemical secondary elements) have also been used for a long time.

Also, the known flywheel storage principle [4, pp. 178ff] in combination with an electrical machine has also been developed further. It is used in vehicles as well as in stationary energy devices. It can release within a few seconds the entire energy contents.

New concepts have been developed which use metals such as silicon [5] or aluminum [6] as universal energy carriers. For example, after the manufacture of pure silicon, the energy stored through the manufacturing process can be recovered in various processing steps with the aid of nitrogen and water via intermediates ammonia and hydrogen [5, pages 7ff].

In addition to solar chimney power plants that provide approximately constant power output, the only regenerative form of energy that is available continuously on demand in accordance with the corresponding demand of the consumer is geothermal energy.

Solar chimney power plants require extensive installation areas and will be built presumably only in desert areas far away from densely populated areas. In [12], a combination of a solar chimney power plant in connection with a solar thermal power plant is described. In this connection, the solar chimney power plant is employed for removing lost heat of the solar thermal system that can now be operated with a single water filling of the cooling system continuously. The extracted energy can be transmitted by using high-voltage power lines over land at economically acceptable conditions into the densely populated areas.

In contrast to this, the geothermal energy can be used basically at any desired location. In upper layers, up to approximately 20 m, the solar radiation has an effect on the soil temperature. In some regions of the earth, the first meters can be heated by solar radiation to temperatures of 50° C. or, conversely, can be cooled in winter to the freezing point and below. Accordingly, a temperature course results that depends only on the season. The solar thermal energy that is stored within the soil can be utilized, for example, by using horizontal geothermal collectors in connection with heat pumps for heating buildings. This energy is referred to generally as near-surface geothermal energy.

The combination of solar collectors on the roof with devices for utilizing near-surface geothermal energy by geothermal collectors or geothermal probes and heat pumps is known. It is even possible to store the heat energy collected in summer by means of solar collectors with the aid of heat exchangers within the soil at minimal depth and to use a portion of this energy again for heating starting in fall [7, pages 89ff]. Generating electricity is not provided for in these concepts.

Underground water currents, aquifers that conduct warm water or hot water, and soils that are heated by volcanic activity are used directly for heating and for producing electricity. The geological and technical principles are described in detail in [7] and [8].

Aside from the near-surface geothermal energy there is also heat energy in the deep underground. It originates according to [7, pages 9ff] from three different sources:

It is stored energy that originates from the gravitational energy that was released during formation of the earth.

It is a residue from the primary heat present before the formation of the earth.

It is generated by the decomposition of radioactive isotopes in the earth's crust. This heat is stored in the earth as a result of the minimal heat conductivity of rock.

The heat flow that results therefrom is given at 63 mW/m$^2$ [7, page 40]. This energy flow is referred to as deep geothermal energy. For an initial coarse estimation of the temperature increase in the deep underground of the continental crust 30° K. per km can be assumed [7, page 34]. This heat reservoir is available at any location on earth.

The method for using the heat of the deep underground will be described in the following. In the hot dry rock method (HDR) the cracks that occur naturally within the rock are used for forming a heat exchanger.

First, two boreholes at a spacing of a few hundred meters are driven in up to depths of 7000 m. Here a temperature of approximately 210° C. is present provided that no effects of volcanic activity exist that would further increase the temperature. Water is forced into one of the boreholes under high pressure. The water penetrates into the cracks that are naturally present in the rock. Because of the high pressure, the cracks are widened. The forces present within the rock can now cause a very minimal displacement of individual rock layers. When the pressure of the water is reduced again, the rocks remain in the new position and therefore provide permanent new widened cracks. The process of forced water penetration is repeated several times and in the end performed until the water will exit again from the second borehole with the aid of several pumps. Depending on the flow rate and the borehole depth the water has a temperature corresponding to that of the deep underground.

By a system of microphones, the size and the spatial expansion of the crack surfaces acting as a heat exchanger can be determined based on the breaking noises within the rock. Drilling can be performed up to a depth of 10 km. In this connection, it is even possible to guide the bore head horizontally in the deep underground after having reached a depth of several thousand meters [8, page 79]. Individual areas can be drilled in a targeted fashion in this way.

The technical knowledge for exploring the heat energy in deep underground has been developed considerably also due to the investigation and exploration of natural gas and oil deposits [7, page 208]. In Europe, an HDR system as a research facility is operated at the moment in Soultz-sous-Forets.

In the older literature [9, pages 150ff] an assessment of the usable energy potential by means of the HDR method shows that the available heat energy decreases due to the gradual cooling and as a result of the minimal supply of heat flow of the rock so that finally it can no longer be utilized economically. Reheating of a heat potential that has been exploited over several days can take up to several decades. Also, potential assessments [7, page 214] are based on a utilization duration of a geological area of 100 years. Subsequently, the exploitation of additional heat energy quantities is no longer considered economical.

Assessments of the exploitation of large heat energy quantities over a time period of a few decades show that for reheating possibly several hundred, even up to 1000 years are required. After exploitation of the heat of a geological reservoir, the device therefore would have to be dismantled and would have to be newly erected at a distance of a few kilometers. Dismantling of the device and the development of a new location incur new costs. In densely populated areas it is also possible that no new industrial facilities can be erected. As a consequence, the number of possible power plant locations decreases.

This suggests the conclusion that the utilization of geothermal energy according to the HDR method for the generally assumed heat flow of approximately 63 mW/m$^2$ can be realized according to the present state of the art [7, page 212] in an environmentally friendly way but, when considering human time frames, this represents a single exploitation of an energy potential. The sustainability that is required today in power industry therefore makes such an energy exploitation questionable because future generations cannot utilize these locations for a long period of time. Even sites for power plants however are present only to a limited extent.

SUMMARY OF THE INVENTION

It is an object of the invention to provide a concept according to which a combination of fluctuating renewable forms of energy and energy storage devices, at onshore sites, at the coast, or in shallow seas, e.g. the North Sea, can be used without causing an unfavorable $CO_2$ emission and increased costs by additional fuel consumption for making available regulating and compensating energy. A power plant concept is to be developed that enables large power plant units within the 100 MW range and above in the context of an energy industry that is based solely on renewable forms of energy. The concept should also contribute to the goal of eliminating fossil and nuclear power plants in the future.

As a solution to this object, it is proposed to integrate a long-term energy storage device in the form of at least one underground heat energy reservoir of a geological area and a short-term storage device with at least one process that converts energy and whose waste heat is returned into the underground heat energy reservoir at one location into a power plant for producing energy carriers such as electricity and/or gas. At least one device for recovering fluctuating regenerative energy is connected to this power plant, directly on site or remote by means of a high-voltage grid. This power plant concept is referred to in the following as an integrated geothermal energy conversion plant (IGEC).

Aside from the known continuous recovery of renewable energy from solar chimney power plants, it is possible only by means of geothermal energy to generate continuously energy basically at any location on earth and to combine it expediently with other fluctuating renewable sources.

The minimal heat flow of approximately 63 mW/m$^2$ in the earth's crust is also proof of excellent heat insulation of the rock. Since a geological area in the deep underground does not have available a quickly regenerating energy flow such as solar energy or wind energy, it should be considered an energy storage device with an initial filling. In the context of a suitable operation management of energy removal and return of energy, an erected power plant can be operated without temporal limitation because there is no permanent exploitation of a one-time energy reservoir.

The power plant system is designed such that it comprises at least one compressed gas storage device, at least one gas compression device, and at least one gas utilization device. It communicates with at least one device for utilizing renewable energy such as solar energy, wind energy, hydropower, ocean thermal energy, ocean waves, ocean current and tidal current, ambient heat or cold. Advantageous further embodiments of the power plant system according to the invention are provided in the dependent claims.

BRIEF DESCRIPTION OF THE DRAWINGS

The concept will be explained with the aid of drawings illustrating different embodiments.

FIG. 6 shows compression of gases. FIG. 7 shows an electrolysis device that is provided with low-pressure and high-pressure storage devices. FIG. 8 represents the direct conversion of electricity into heat by electric heating elements in which the heat energy is supplied by heat exchangers to the geothermal storage device.

FIG. 9 shows as a block diagram a process for generally converting energy. The

FIG. 10 shows gas pressure expansion turbines partially in connection with low-pressure storage devices and devices for recovering lost heat.

FIG. 11 shows a gas expansion device with additional combustion.

FIG. 12 illustrates a device that, after gas expansion, converts hydrogen, oxygen and also compressed air at low-pressure level in fuel cells into electricity and stores the lost heat by means of heat exchangers in the geothermal area.

DESCRIPTION OF PREFERRED EMBODIMENTS

Figure 1:
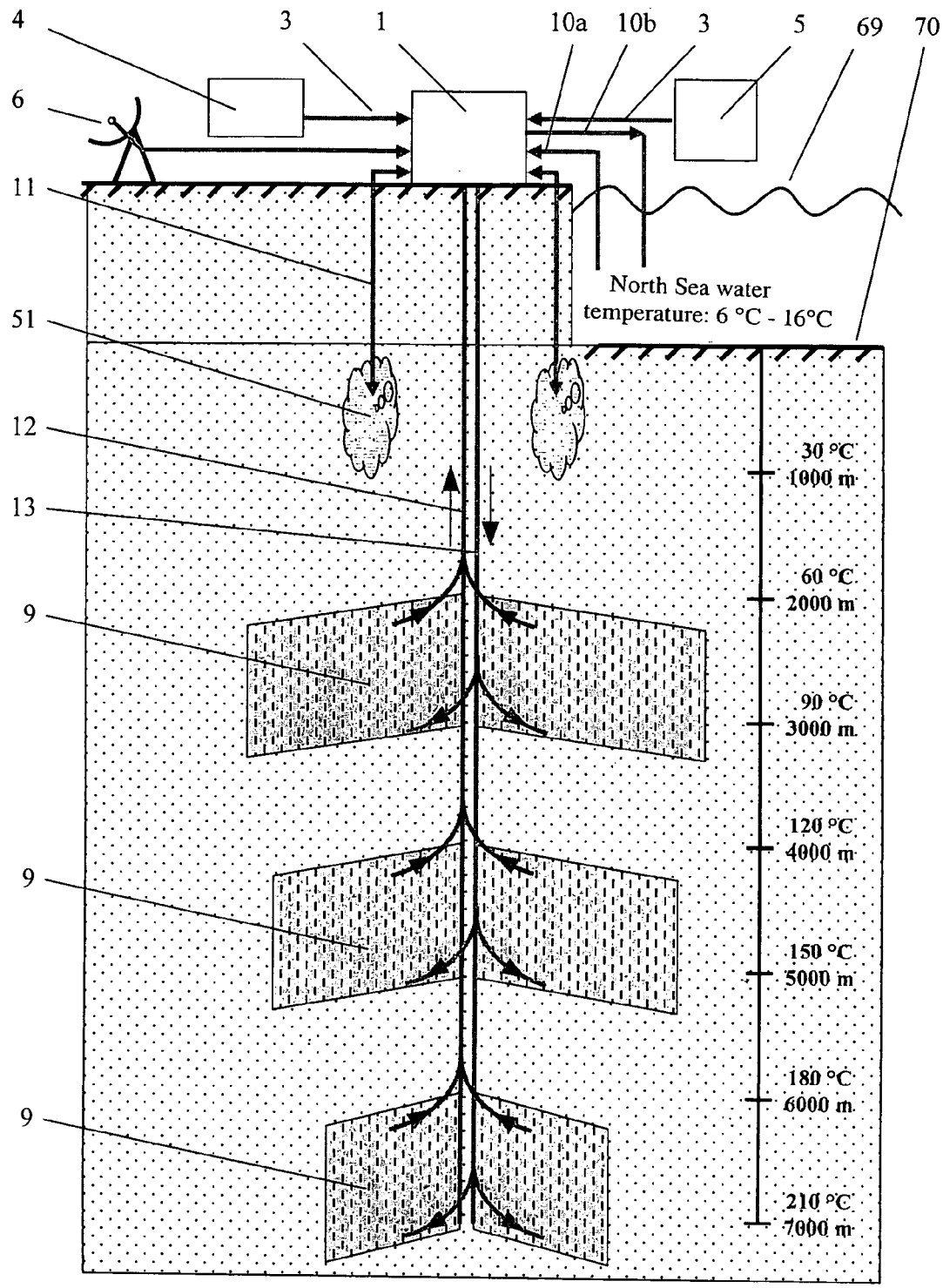
FIGS. 1 and 2 show geothermal power plants with a possible arrangement of geothermal areas as long-term storage devices in combination with pressure storage devices as short-term storage devices that are constructed on land, at the coast, or on the ocean and use energy from renewable sources.

According to FIG. 1, a power plant system 1 for electrical current generation and for recovering process heat is configured with connecting pipelines 12, 13 connected to the geothermal area 9. In addition, solar thermal energy can be supplied by means of collector systems 6 utilizing liquid or gaseous working media 3 through heat exchangers into the geothermal reservoir 9. Generally, the known land-bound regenerative sources 4 as well as offshore devices as regenerative sources 5 can be coupled with the geothermal area 9. Starting with FIG. 3, different possibilities are illustrated in detail. The water required for cooling originates from a standing or flowing body of water and is conducted through pipelines 10 to (10a) and from (10b) the plant. At one location several geological areas 9 can be developed as heat storage devices or sources adjacent to one another and on top one another. The distances between the individual areas 9 are to be selected to be sufficiently large so that they do not mutually affect one another. For example, to enable that an area 9 that has been thermally (partially) depleted can regenerate over a period of time of a few years up to a few decades, another area 9 is utilized in the meantime. After thermal regeneration, the prior partially depleted area 9 can be used again. This enables continuous operation at a power plant site for long periods of time. The different geothermal areas 9 are developed either by only one pair of lines 12, 13 for supply and removal or they are connected by a plurality of lines extending into the different geothermal areas 9 to the power plant system 1.

As possible compressed gas storage devices 51 to be combined with the geothermal power plant, aquifers, salt caverns, and shut-down mines can be used [4, page 32] which communicate by pipelines 11 with the power plant system 1. In this connection, pressures of approximately 100 bar to 200 bar can be reached. Possible are also conventionally produced pressure containers 55 that must then have appropriate large dimensions. In contrast to the underground pressure storage devices 51, pressure vessels 55 can also be designed today to withstand very high pressures, for example, 500 bar to 1000 bar. Accordingly, the pressure vessels 55 can be selected to have a smaller geometric volume while they can still store acceptable quantities of pressure energy. In the case of appropriate properties of the deep underground, in the future also empty oil and natural gas fields as they are present, for example, underneath the ocean bottom of the North Sea, can be used as pressure storage devices as well as, after widening of the cracks that are present as a geothermal storage device. Of the entire installed components of the oil industry, including the depleted deposits, at least a portion can still be used after retrofitting.

Figure 2:
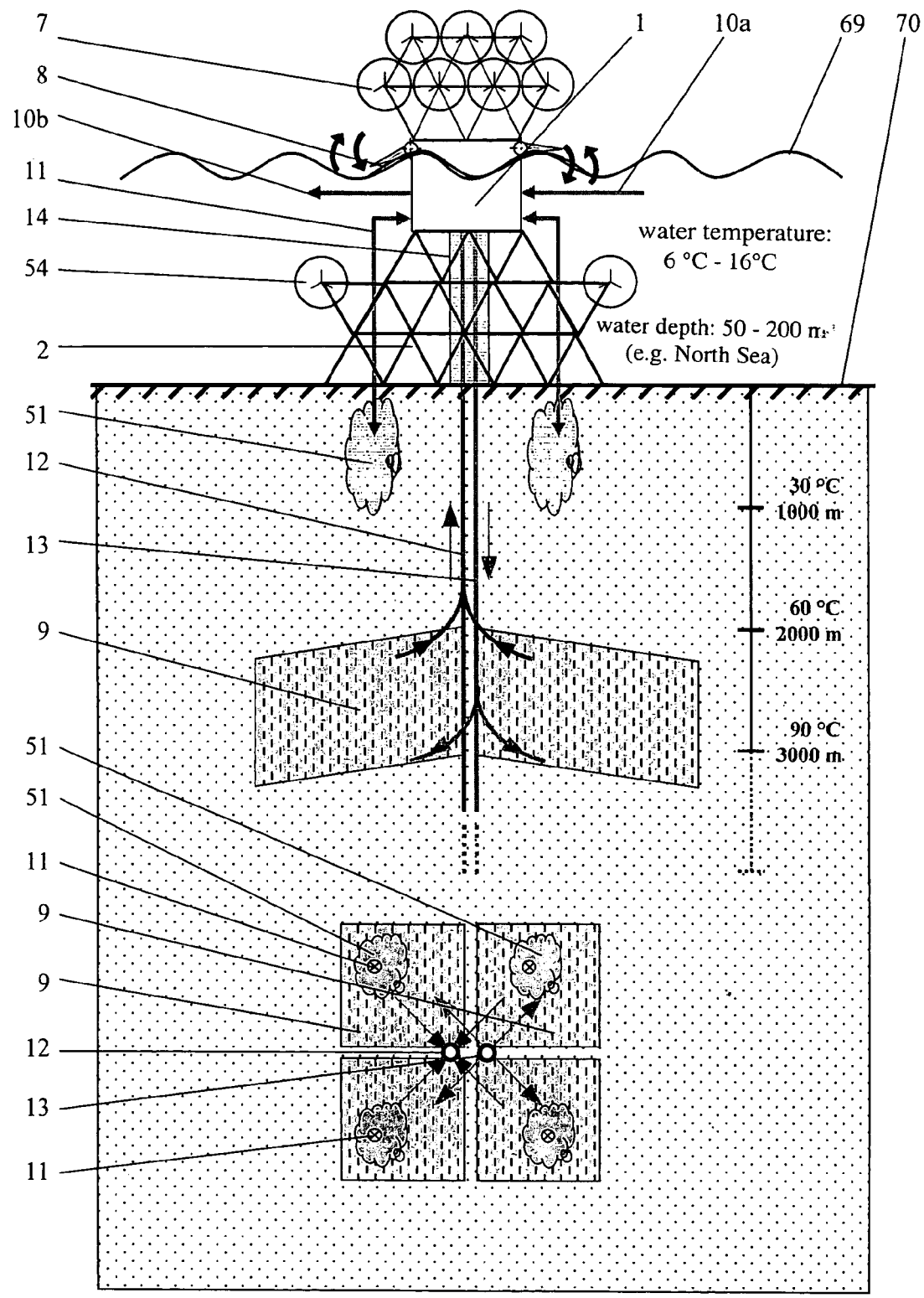

FIG. 2 shows a support structure 2 installed in the ocean with power plant system 1 that comprises the components for utilizing a geothermal area 9. The system 1 communicates moreover by pipelines 11 with the compressed gas storage devices 51 positioned underneath. Additional energy converting devices, for example, wind energy devices 7, ocean wave convertors 8, ocean current converters 54 for the purpose of producing electricity are integrated directly into the support structure 2. In this way, the same site of the power plant system 1 is used in multiple ways. The hot water that is pumped from the geothermal area 9 is guided in pipes 12 upwardly and the residual heat is returned through pipeline 13 downwardly. The pipelines have heat insulation 14 in order to prevent temperature losses upon passing through the cold body of water. The lower half of FIG. 2 also illustrates schematically in an exemplary fashion a plan view of four separate underground compressed gas storage devices 51 and geothermal areas 9 positioned underneath.

The thermodynamic system components for generating electricity based on geothermal energy are similar to those that are used in connection with utilizing ocean thermal energy according to the concept of the CLOSED CYCLE SYSTEM [10].

Figure 3:
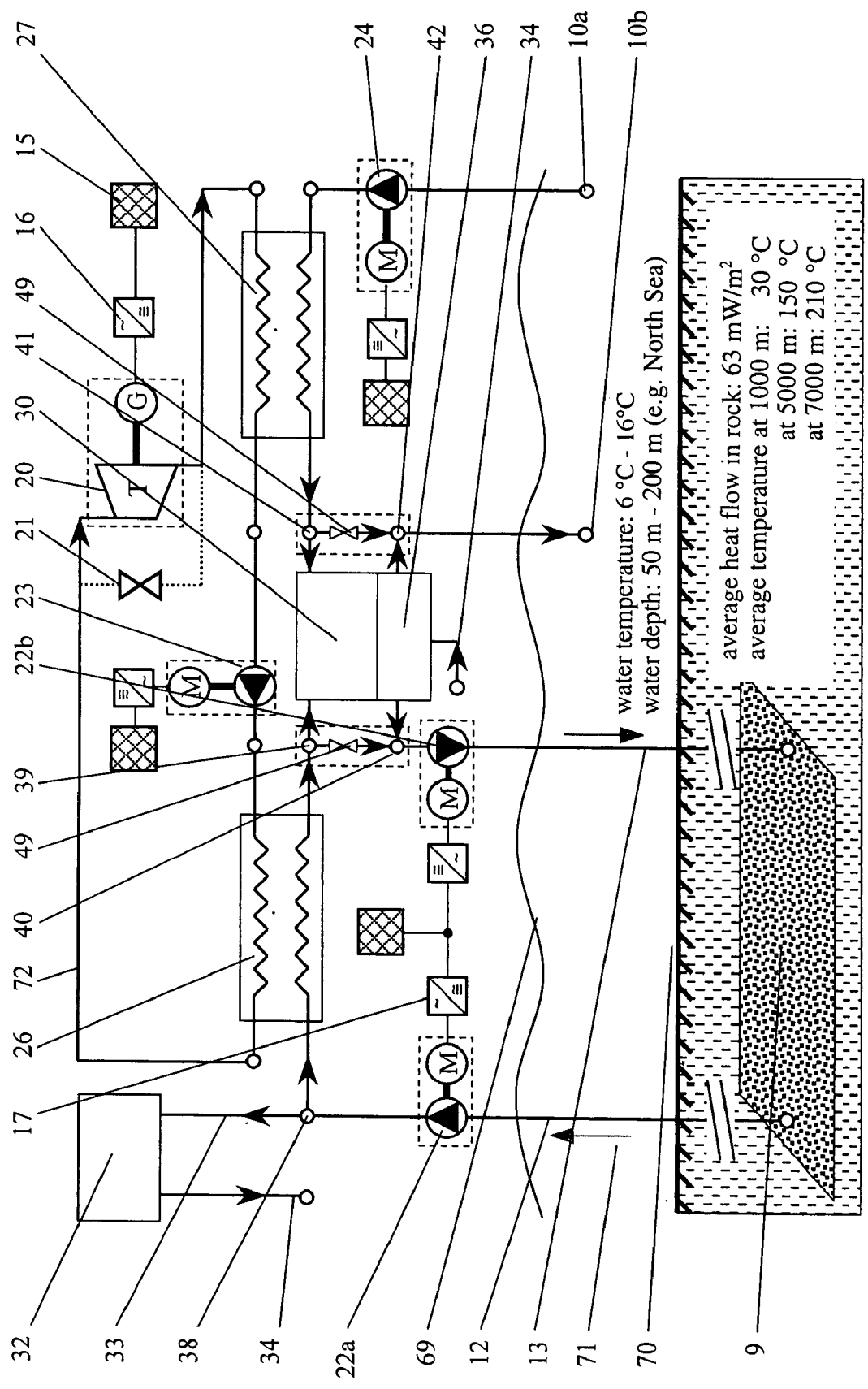
FIGS. 3 and 4 show the components required for utilizing thermal energy of a geothermal area at minimal temperature differential for producing electricity. It is also illustrated how other processes that supply energy or take up energy can be integrated into the geothermal power plant.

FIG. 3 shows a heat exchanger 26 operating as an evaporator that supplies the heat from the geothermal area 9 through the production line 12 to the secondary circuit 72 that is, for example, filled with ammonia as a working medium. The pressure increase and the enthalpy increase of the secondary working medium are utilized by means of a turbine generator set 20 with power electronics 16 for generating electricity to be supplied to an electrical grid 15. Cooling of the secondary working medium is realized again by an additional heat exchanger 27 which is operated primarily as a condenser. Downstream of the condenser set 27 the secondary working medium is returned by an electrically operated supply pump 23 into the evaporator 26. The water that is supplied by means of at least one electrically operated pump 22a through the production line 12 into the heat exchanger 26 is returned again with the aid of at least one further electrical pump 22b through the injection line 13 into the geothermal energy storage device 9. Cooling water is supplied from a water reservoir by electrical pumps 24 to the condenser 27 via water inlet 10a and water outlet 10b. The employed power electronics 17 for the electric motors enables operation of the pump devices 22a, 22b, 23, and 24 in accordance with demand.

In contrast to the ocean thermal energy conversion, when using geothermal energy the configuration of the system can be designed for greater temperature differences. In principle, higher efficiencies for generating electricity can be achieved that are approximately 10% and more. As a working medium, environmentally friendly substances are to be selected which must be biologically degradable and also do not enhance the greenhouse effect.

After the heated water has been supplied in the production line 12, the process heat can be removed at various locations of the geothermal circuit. It is also possible to return the heat that is not needed into the circuit of the geothermal reservoir 9.

Downstream of the evaporator 26 the cooled but still warm water is made available for heat transfer to a process A 30 by means of a heat exchanger that is correlated with the process A 30. It is now possible to release the lost heat of the process A 30 through the heat exchanger into the injection line 13. The water in the injection line 13 is recharged with heat energy and the heat energy is subsequently released again into the geothermal storage device 9. Starting with FIG. 6, different processes are described that transfer their lost heat through heat exchangers into the injection line 13. A bypass with valve 49 enables switching off of the heat transfer from process A 30. The additional required shut-off valves are correlated with the process A 30 as will be described starting with FIG. 6.

It is also possible to divide the water flow of the production line 12, when appropriately designed, and to enable a heat transfer 33 at a high temperature level not only to the evaporator 26 but also to an additional process B 32. After utilizing the process heat, heat dissipation 34 at low temperature takes place. By means of a mixing device 36 with heat exchanger, this residual heat is returned into the injection line 13 for heat transfer into the geothermal storage device 9 or, by means of the mixing device 36, it is further used by process A 30. The mixing device 36 in the simplest case is a branch or collecting device with control and regulating valve devices 49.

The water side of the evaporator 26 and the heat exchanger of the process A 30 together form a serial connection of at least two heat exchangers wherein the temperature drops with increasing number of components. A possible parallel connection of partial processes $A_i$ 31 is explained in FIG. 5 where all partial processes $A_i$ 31 are supplied at the same temperature level.

When the total process A 30 and the partial processes $A_i$ 31 and also the process B 32 need cold water, an additional heat exchanger that is correlated with the processes A 30, $A_i$ 31, and B 32 can be connected in series as a cooling device also into the strand of the condenser 27. Branching off the cold water upstream of the condenser 27 is also possible but not illustrated. A parallel connection of several water pumps for supplying the cold side is also possible but also not illustrated. By means of control and regulating valve devices 49, the processes A 30, $A_i$ 31, and B 32 are switched on and off in accordance with the optimal operating management relative to heat flows and energy utilization. In contrast to the concepts of ocean thermal energy recovery, cold water from minimal depth, as it is available in the North Sea throughout the entire year (6° C. to 16° C.), is made available for cooling. While in the southern waters the warm surface water is the heat source, the geothermal reservoir 9 is now used as an energy source and the ocean water is used only for cooling. In contrast to the ocean thermal energy recovery, minimal cooling water flows are now sufficient for, in comparison, identical supply of electrical grid power.

The heat proportion that is supplied via the injection line 13 into the deep, is available at the production side 12 only with greater time delay because a portion of the forced-in water circulates first within the underground. However, this also leads to heating of the developed geological area 9 in the long run.

Inasmuch as the geological conditions allow for this, the flow direction can be reversed in the production and injection lines 12, 13 with an appropriate design of the pumps 22a, 22b. This would have the advantage that in the area of the geothermal storage device 9 with the production line 12 a higher temperature level for reuse could be adjusted faster. The flow direction changes depending on removal or recharge operation of the heat storage device 9. For correspondingly large heat quantities a process A 30 could become the dominant heat source wherein the energy is divided into a part for producing electricity by means of the turbine generator sets 16, 20 and a part for storage in the geothermal area 9.

A geothermal area 9 developed according to the HDR method forms together with the device components 12, 22a, 26, 22b, 13 a closed circuit. Only when a significant water loss occurs in the deep underground 9, a portion of the returned heat is also lost. A minimal water loss however is a basic prerequisite for utilizing a geological area 9 as a heat storage or source and is therefore to be viewed as a quality feature of the geothermal area 9.

The arrangement of the components in FIG. 3 provides a possibility for consuming electricity. With this basic diagram of the secondary circuit 72 a thermodynamic process can be realized also counterclockwise, i.e., a heat pump operation is possible. For this purpose, the supply pump 23 must perform a pressure increase such that the heat exchanger 26 can release the heat at elevated temperatures into the water of the geothermal primary circuit 71 so that geothermal energy storage 9 is thus charged. With the electrical energy that originates from the excess electricity of regenerative sources, the supply pump 23 is operated. In addition, heat is also removed from the working medium (cooling medium) that flows through the heat exchanger 27. The water in the heat exchanger 27 is cooled and leaves the heat exchanger 27 at a temperature lowered by a few degrees. By means of a turbine 20, a portion of the pressure energy can be recovered. In order to simplify the configuration and to be able to operate the secondary circuit 72 at a different working point, it would also suffice to provide an expansion valve 21 that possibly must be cooled, for example, in a parallel connection to the turbine 20. With the described operation, excess electricity could be used expediently. For an appropriate configuration in the range of several hundred MW it would also be possible to reduce the heat energy of rivers and to employ a portion of the energy of the warm water. For discharging the geothermal storage device 9, it is sufficient to employ a turbine 20 with generator suitable for producing electricity and to operate the cooling medium circuit at an optimal working point for the turbine in a clockwise thermodynamic cycle. In this way, this geothermal power plant can utilize in connection with excess electricity of regenerative sources a portion of the ambient heat, for example, of a body of water.

When the condenser 27 is operated in a closed cooling water circuit, comprising cooling network and cooling medium pumps, it is also possible to recover heat from the ambient air in this way. Small devices, operated as domestic heating devices, have already proven this principal function. However, for a device in the MW range, large surface area heat exchanger networks are required.

Figure 4:
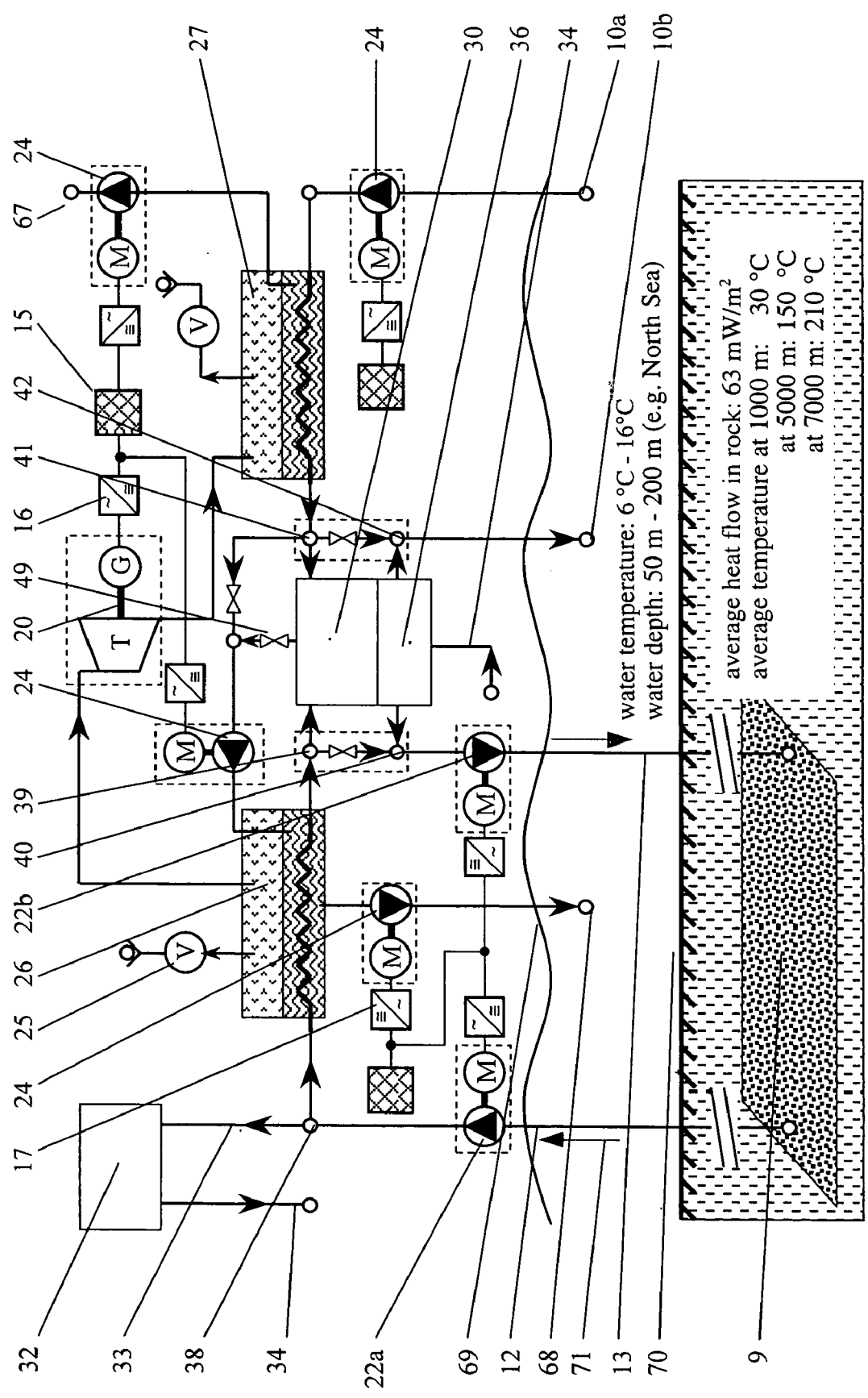

FIG. 4 shows a device that is suitable for operation of steam turbines 20 at a minimal temperature level. In order to prevent the use of special evaporator media such as ammonia, in a power plant water itself can be used as a working medium for operating turbines with generators. This does not refer to the hot water of the geothermal circuit itself and the conventional steam generators with closed circuits. This concept employs steam generators and condensers with underpressure devices. For an open process, the water supply must be ensured externally by an appropriately large river or even by providing a site in or at the ocean.

System components are required that are known already from ocean thermal energy recovery according to the principle of the OPEN CYCLE SYSTEM [10]. The evaporator 26 and also the condenser 27 comprise exchangers that cool or heat a chamber that is filled e.g. with sea water. Vacuum pumps 25 ensure the required underpressure in the evaporator 26 and in the condenser 27. In this way, water can take up, even at minimal temperature level, large quantities of heat energy and develop sufficient steam pressure for driving the turbine-generator sets 20. Water pumps 24 having an electric drive fill the evaporator 26 or the condenser 27. In addition, it is also possible to employ from the process A 30 the lost heat for preheating the water in the evaporator. This is illustrated by an upwardly oriented outlet from the process A 30 with control device 49.

With an appropriate configuration, it is possible to remove desalinated water through a device 67 from the condenser 27, for example, by means of electrical drives and the required pumps 24. A further advantage resides in that the turbine 20 can be operated with desalinated water and, in principle, desalinated water is available for the cooling circuits of sensitive device components. Water with increased salt contents is diluted in the evaporator 26 with sea water to a concentration that is environmentally friendly and is pumped back into the ocean through the device 68 by the pump 24. In this way, for utilizing the energy of minimal temperature differentials when employing water as a working medium, the basically known risks of other evaporating and cooling media can be avoided and, in addition, desalinated water can be produced. The processes A 30, $A_i$ 31, and B 32 and the mixing device 36 are connected as already shown in FIG. 3 and function as described above.

Before additional power plant processes will be described, the basic possibilities of connecting several partial processes $A_i$ 31 will be explained.

Figure 5:
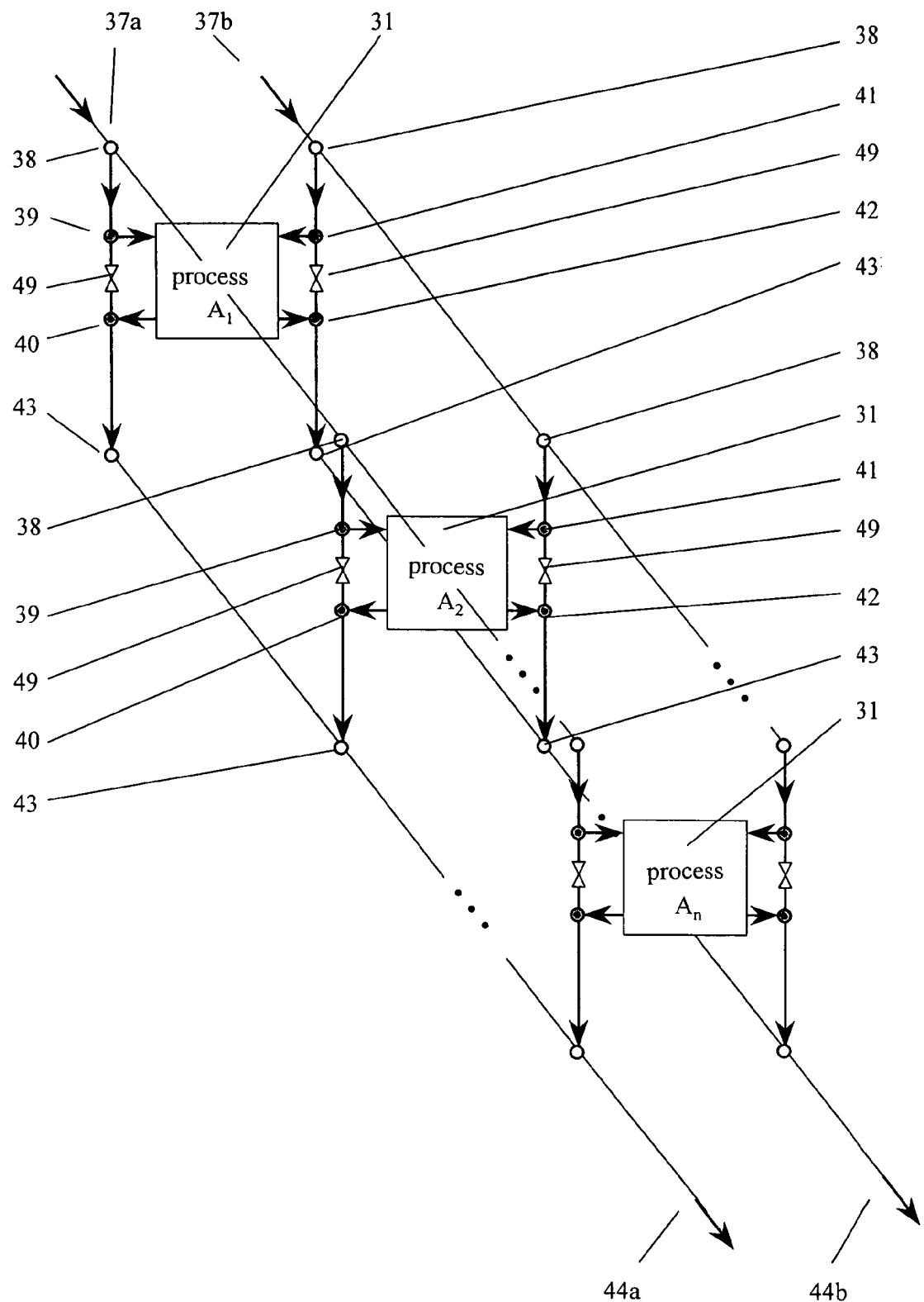
FIG. 5 shows the principal possibility of integration of many partial processes.

FIG. 5 illustrates the parallel connection of additional processes $A_i$ 31 in order to be able to supply by means of conduits several partial systems with a hot water side 39, 40 and a cold water side 41, 42 starting respectively at the same temperature level 37a, 37b. Branch systems 38 divide the water flow and the heat/cold is supplied to the partial process $A_i$ 31 through an inlet 39, 41. All outlets 40, 42 are connected to a collecting device 43 and removal is realized through lines 44a, 44b. There is also a bypass with valve devices 49.

Figure 7:
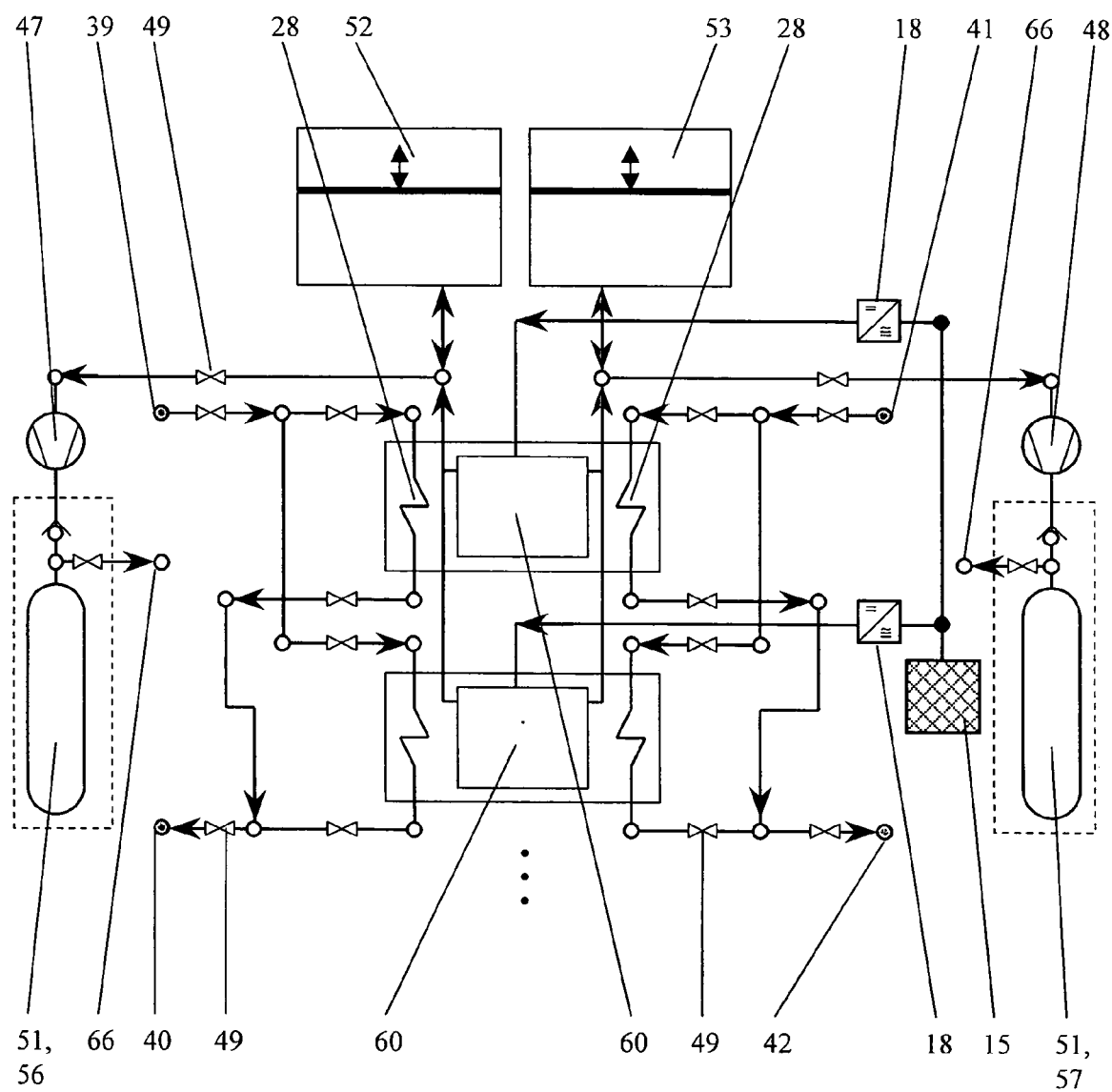
Figure 12:
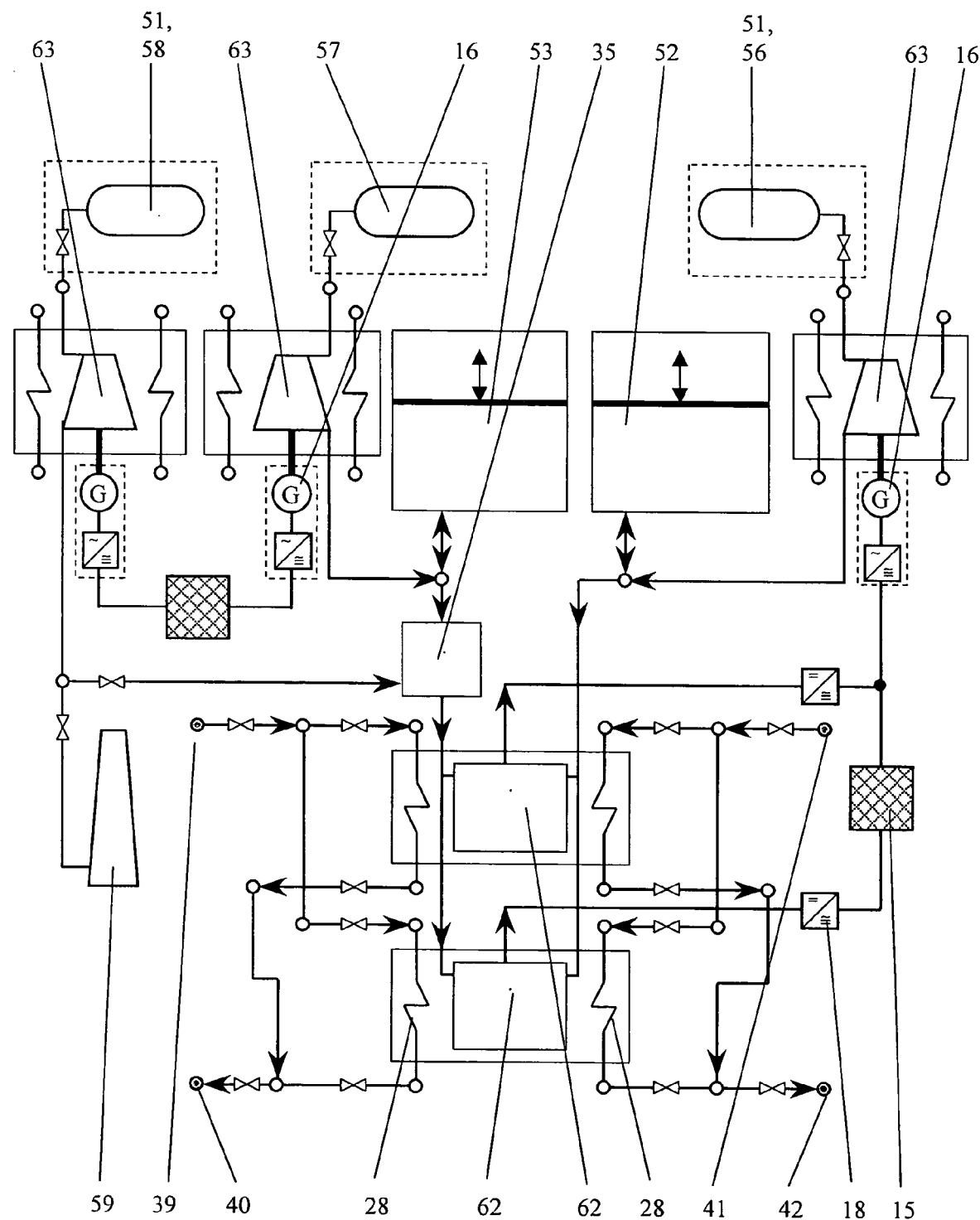

It is possible to operate systems of the same type, for example, only electrolysis devices 60 or only fuel cell devices 62, as illustrated in FIG. 7 and FIG. 12, as well as different systems such as cooling devices of gas compression devices 45 in addition to electrolysis devices 60 and fuel cell devices 62, but, with regard to thermal engineering, parallel and independent from one another. This enables great freedom in regard to design and configuration of an integrated power plant system 1. Optimal solutions can be developed that are based on the conditions on site and are matched thereto.

The water circuit 71 of the geothermal storage device 9 contains corrosive substances, and device components that conduct saltwater are also subject to corrosion. Depending on the expenditure and the costs, it must be weighed whether, for example, a turbine is to be directly cooled with the water of the circuits that contain corrosive media or wether an additional heat exchanger with its own circuit that contains non-corrosive heat exchanging media is to be installed. A separate cooling circuit requires pump devices and auxiliaries and causes thus increased installation costs. Moreover, additional heat exchangers increase the loss of heat energy in the complete device and this loss cannot be regenerated. In order to concisely represent all Figures, the illustration of cascading cooling circuits with heat exchangers representing the state of the art are omitted.

The thoughts in regard to parallel and serial connections apply also to the process B 32 and its division into individual processes $B_i$ so that repeating the description and illustration is not necessary.

In the following Figures, energy converting processes are described which can be used, depending on the selection and configuration, for example, in connection with the processes A 30 and $A_i$ 31.

Figure 6:
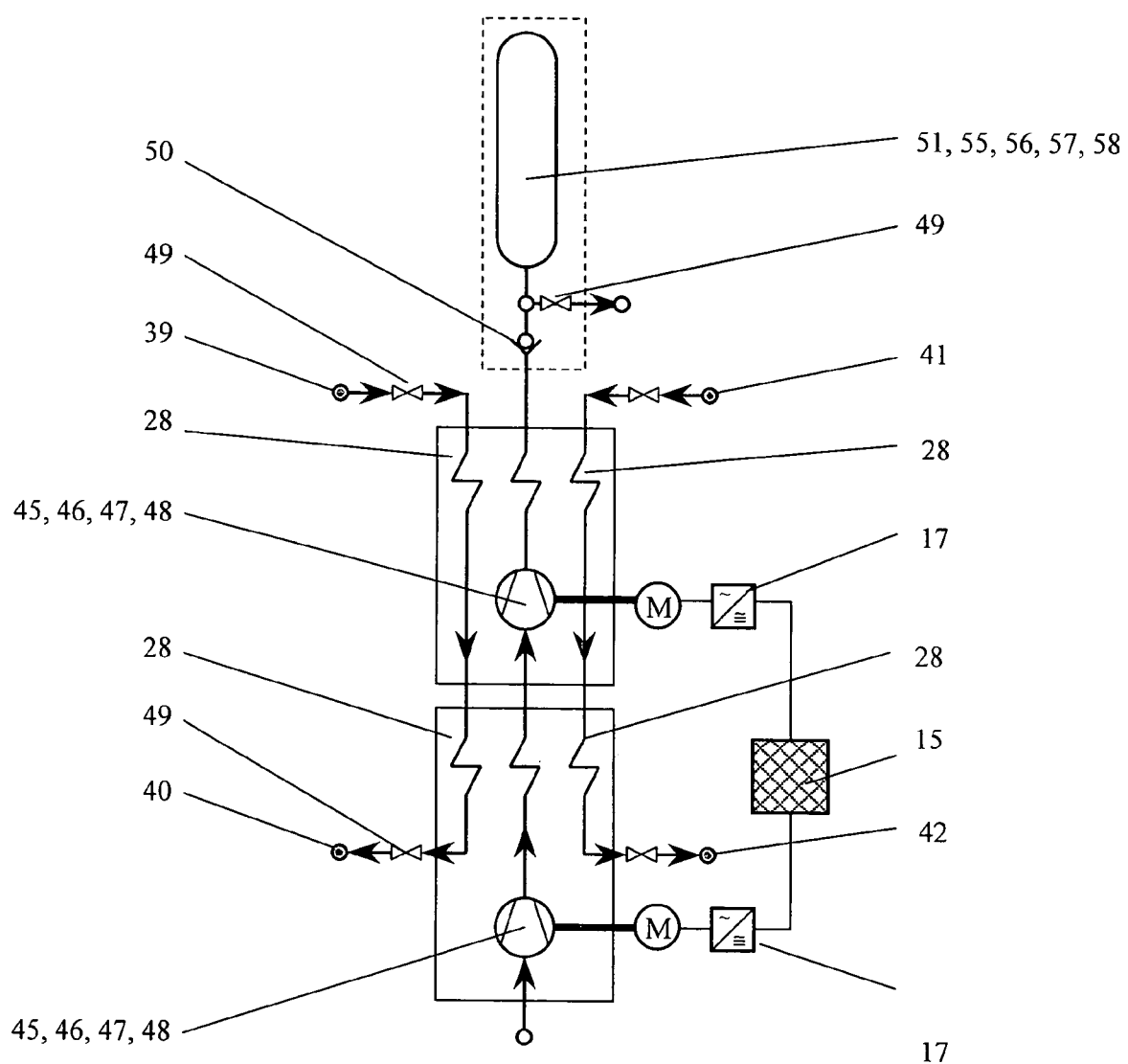
FIGS. 6 to 8 represent processes that consume primarily electricity of regenerative sources and supply their lost heat to the geothermal storage device. In this connection.

FIG. 6, for example, shows a two-step gas compression 45, 46, 47, 48 whose heat loss resulting from compression is dissipated by means of two serially connected heat exchangers 28, for example, via the hot waterside 39, 40. Upon compression, significant heat quantities can be produced. The heat that is coming from the hot water side 40 is removed through the injection line 13 into the geothermal reservoir 9 and stored therein (see FIG. 3 and FIG. 4). The additional cooling devices 28 of the cold water side 41, 42 that are supplied, for example, from the condenser 27 (FIG. 3) via the devices 41 and 42, can be used, for example, in the case of an error within the water circulation through the geothermal storage device 9, for emergency cooling of the compression device and, in this way, can ensure the continuous operation of the compressor device 45, 46, 47, 48. The compressor 45, 46, 47, 48 are driven by the electrical machines with power electronics 17. The electrical energy originates from the power grid 15 that is preferably supplied by regenerative sources. The compressor devices 45, 46, 47, 48 can be used in appropriate configuration for compression of, for example, air, hydrogen gas, and oxygen. The number of compressor stages depends on the final pressure to be achieved for storing (51, 55) the gas. For low pressures, optionally one compression stage is already enough, or it is necessary to sequentially arrange more than two stages in order to obtain particularly high end pressures. Gas compressors 45, 46, 47, 48 operated by electric machines can be run up in a few minutes to full power and are well suited as a consumer for regulating the over supply of a power grid 15. When having an appropriate configuration, underground storage devices, as discussed in the description of FIG. 1 and FIG. 2, as well as pressure vessels can be used as pressure storage devices 51.

With a suitable configuration of the compressor devices 45, 46, 47, 48 as an expansion devices in a machine, including the electrical components 16, 17, the system can be operated also in reverse operation for generating electricity. Moreover, there are compressors and turbines with adjustable blade geometry in order to enable optimal adjustment over a larger working range for maximum energy utilization. The heat loss that occurs in all operating situations from machine and exhaust gas is stored again in the deep underground 9.

Another process for utilizing excess electricity from regenerative sources is illustrated in FIG. 7 comprising an electrolysis device 60 with several partial devices 60 for producing hydrogen and oxygen. The electrical energy is derived from the power grid 15. With the appropriate gas compressor units 47, 48 hydrogen and oxygen pressure storage devices 56, 57 are filled. When appropriately configured, underground cavities 51 can be used also.

In order to enable a gas yield with optimum efficiency, electrolysis devices 60 should be operated at a power uptake as constant as possible. A geothermal power plant provides these conditions. When at times electricity is lacking from fluctuating regenerative sources, heat for generating electricity is removed from the geothermal reservoir 9.

In particular, electrolysis 60 with gas storage 56, 57 by means of gas compressing devices 47, 48 (details of the compressor devices in FIG. 6) in combination with a geothermal power plant 1 is expedient. During continuous operation of electrolysis 60 the gases are collected in low pressure storage devices 52, 53, for example, up to several 10 bar. In the time period in which excess electricity is produced, high power peaks, as they are known in connection with wind energy devices 7, are used for rapid gas compression from the low pressure range to the high pressure range of several 100 bar to 1000 bar and removed in this way. The electrolysis devices 60 can be operated, depending on the selected electrochemical process, within temperature ranges of 80° C. to 160° C. up to 800° C. (high-temperature electrolysis) [3, 178ff]. The waste heat of electrolysis devices 60 and compressor devices 47, 48 is returned through heat exchanger 28 into the geothermal storage area 9. In this way, a uniform hydrogen manufacturing process with heat recovery is enabled by utilizing, for example, wind power peaks.

Figure 8:
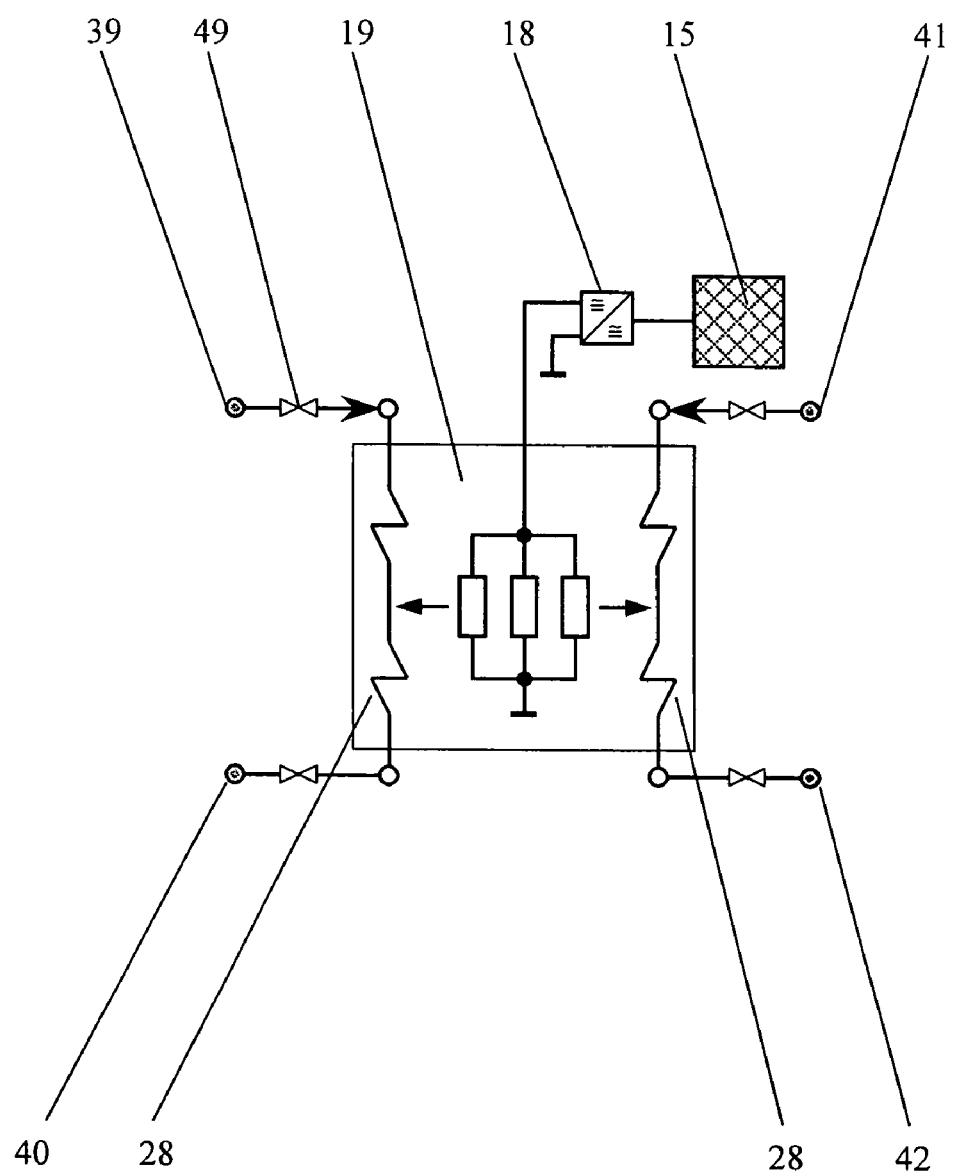

FIG. 8 shows an arrangement of electrical heating elements 19 that convert excess electricity directly into heat. Since electricity represents essentially pure energy, a direct conversion into heat, i.e., a conversion into energy of low quality, is initially to be avoided. Electrical heaters 19 cooled with water can however be realized in a simple and inexpensive way so that their use in connection with a good heat storage device 9 can be absolutely economically reasonble. In any case, by means of simple electrical switching elements but also modern power electronics 18, electrical heaters 19 can be kept in reserve as an energy sink for quick regulation in order to be able to take up excess electricity when other energy-consuming processes fail. Also, over-voltages within the power grid can be easily avoided in this way. The produced electrical energy from fluctuating sources is stored at least in the form of heat in the ground 9. The targeted reduction of excess electricity represents a reimbursable service in the electrical energy industry. Other power plants can continue to operate at optimal working point and must not throttle their operation. Independent of the operation of the hot water side 39, 40 the cold water side 41, 42 ensures a reliable operation even when the geothermal power plant part fails as an energy sink.

Figure 9:
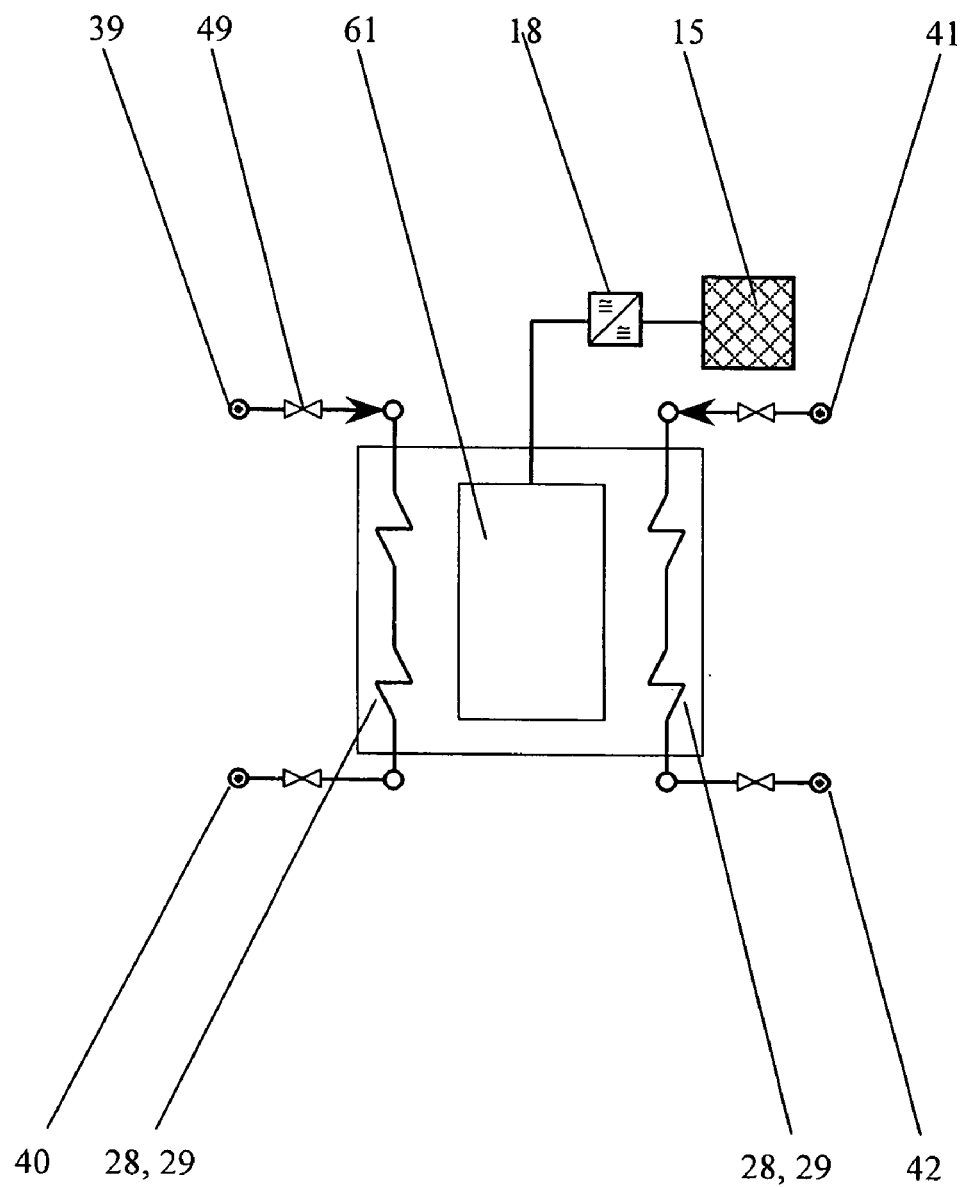

FIG. 9 shows in general a process 61 for converting energy. The dissipation of lost heat and the supply of required processing heat is realized through heat exchangers 28, 29 in order to separate the geothermal circuit with corrosive medium and the energy-converting process 61 with other working media.

For the energy-converting process 61 is also possible to use Stirling engines in combination with electrical machines and to operate them between the hot water side 39, 40 and the cold water side 41, 42 for generating electricity (clockwise thermodynamic cycle). Since the Stirling engines operate at low temperature level and minimal temperature differences they represent an alternative to the devices of FIG. 3 and FIG. 4 operating with liquid working media. When the Stirling machine is driven by the electric machine with excess current from the power grid, it operates as a heat pump in a counterclockwise thermodynamic cycle. The geothermal storage device 9 is then recharged with heat energy.

A gas liquefaction device that is combined with the devices for producing gas is to be seen as an energy-consuming process. The lost heat that results from gas liquefaction in the system components is transferred via the heat exchange devices 28 to the geothermal area 9 for storage purposes. Gas liquefaction devices can be used individually or in combination for hydrogen, for oxygen, for ammonia, and also for air. The liquefaction of gases enables a high density and thus compact storage of gases. In order to utilize the liquefied gases again in gaseous state, devices for evaporating gas and for heating gas must be incorporated. The evaporation heat can be taken from the ambient air of the system by means of heat exchangers provided with rib surfaces as well as from the geothermal storage device 9 by means of heat exchangers 29. Devices for liquefaction of gas with subsequent evaporation for further use of the gas represent an energy-converting process 61.

In addition to hydrogen other products can also be used as energy carriers. For example, silicon can be produced as a universal energy carrier and raw material from sand by supplying energy. The sand can be taken in a simple way from the bottom of the ocean and can be processed further. The storage energy is recovered from the pure silicon in various process steps by means of nitrogen and water with the intermediate products ammonia and hydrogen. The technical devices required for this energy carrier concept in regard to silicon manufacture and recovery of energy must also be cooled; this is again combined with return of the lost heat into the geothermal area 9.

For the processes A 30 and B 32 it is also possible to use, instead of the processes relevant for the energy industry, described in connection with the previous Figures, production devices for producing other products. For coastal areas in which drinking water in sufficient amounts is lacking, it is also interesting to use heat as well as electric energy for drinking water processing by means of desalination, reverse osmosis, and electrodialysis.

Depending on the temperature level and the installation site, suitable processes must be selected. When in addition to the hot reservoir also a cold reservoir is available in sufficient amounts, it is possible by means of temperature regulation to adjust desired temperature courses or constant conditions independent of the ambient temperatures, as illustrated with the arrangement of the processes A 30 and B 32 in FIGS. 3 and 4. For example, foodstuff production (fishfarming, plant cultivation, algae cultivation) can be optimized and distillation and drying processes can be performed year-round. The subsequent list names a few known examples of low-temperature processes as a function of the temperature level:

| Temperature ° C. | low-temperature process |
| --- | --- |
| 20 | fish farming |
| 30 | bio degradation, fermentation |
| 40 | greenhouse operation for marine plants, vegetables, grass |
| 90 | drying of stockfish |
| 100 | drying of organic materials, dry biomass |
| 120 | freshwater by distillation |
| 130 | producing salt by evaporation and crystallization |
| 140 | packaging of foodstuff |
| 160 | drying of fishmeal |
| 180 | cooling/freezing of foodstuffs by ammonia adsorption |

In the following Figures, the processes required for generating electricity are described. Based on excess electricity or by buying inexpensive electricity, processes can be operated that in general store energy. For example, gas supplies for times of peak load can be provided. Electric energy in the form of peak load electricity is then sold again at comparatively high revenue.

Figure 10:
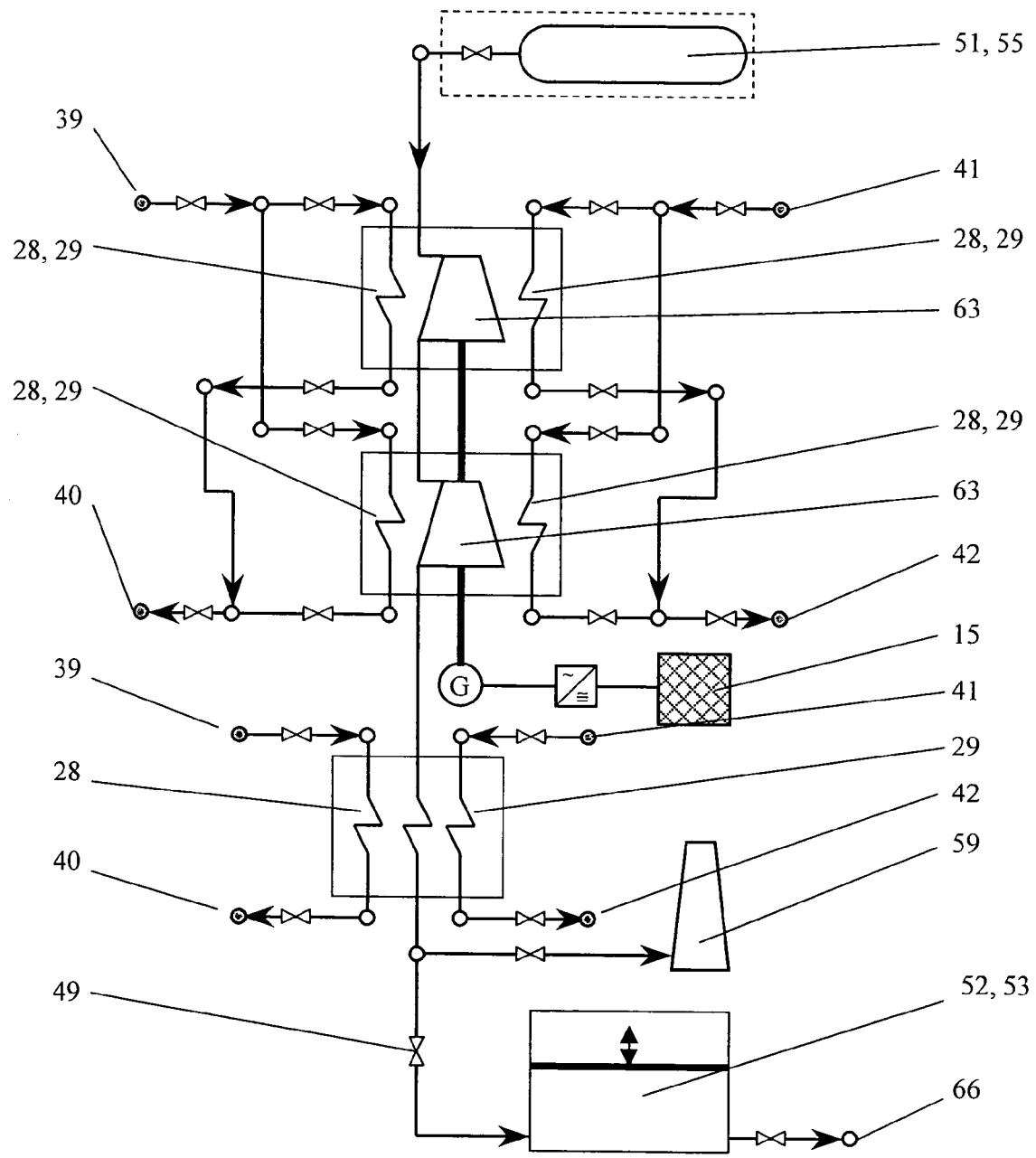
FIGS. 10 to 12 show processes that produce primarily electricity, and, as needed, supply it to a power grid.

FIG. 10 shows a multi-stage gas expansion device 63 whose turbines are connected by generators and power electronics 16 for producing electricity to the electrical power grid 15. Heat exchangers 29 supply the heat energy that may be additionally required for expansion from the ground 9. When heat loss results, depending on the quantity of heat and temperature level, it is regenerated within the ground storage device 9. Foreign expansion of compressed air, the air flow and thus also the lost heat is dissipated directly through the exhaust device 59 into the environment.

However, gases which, like hydrogen or oxygen, serve as energy carriers themselves are collected again in low-pressure storage devices 52, 53 after expansion and are then available again for subsequent process steps via a removal device 66. The temperature of the expanded gas can be matched by a heat exchanger 28, 29 to the next process step. Optionally, heat exchangers 28, 29 are required for temperature adjustment downstream of the low-pressure storage devices 52, 53; this is not illustrated.

Figure 11:
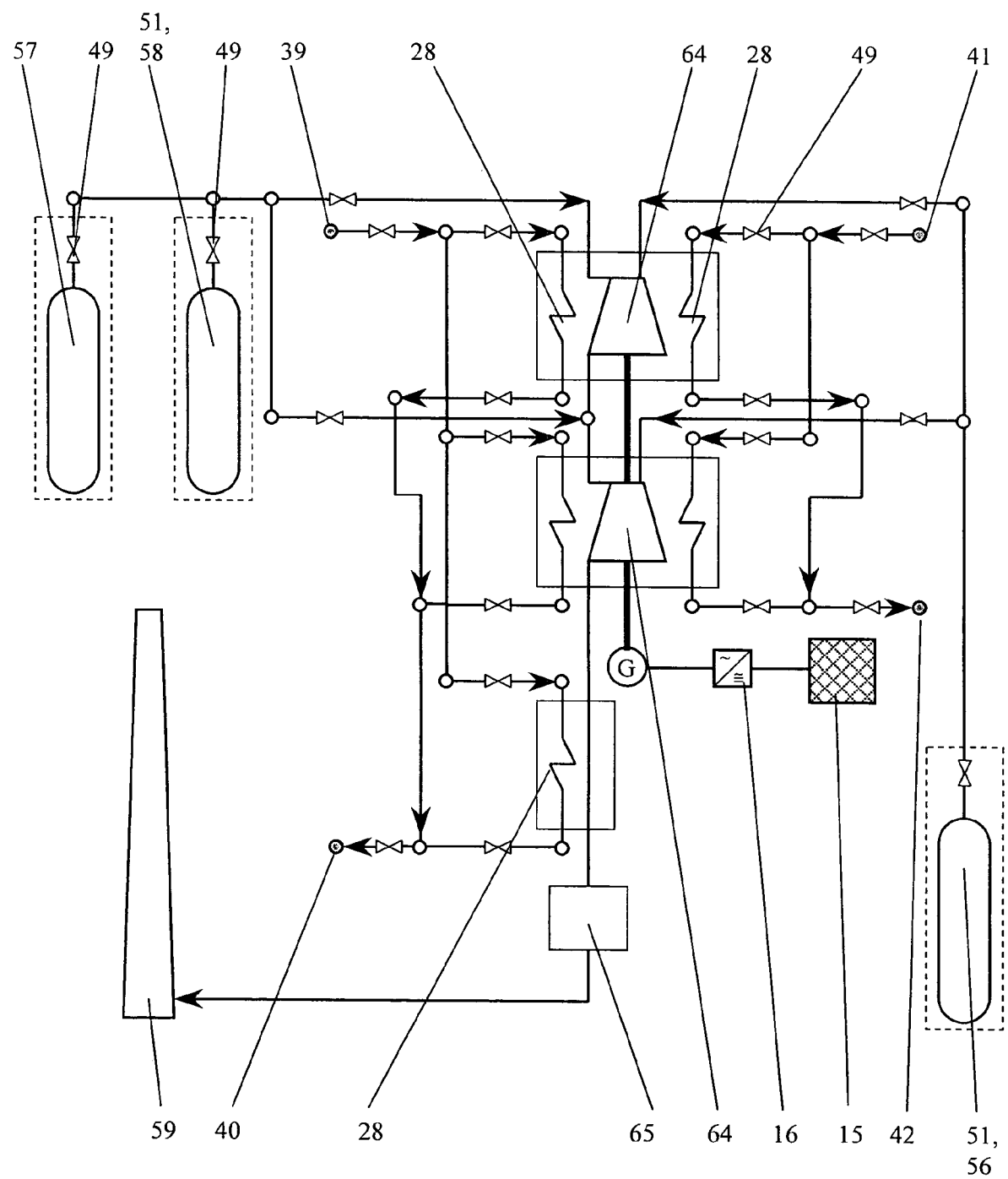

FIG. 11 shows a multi-stage gas expansion device 64 with combustion. The work at the shaft is supplied as electrical current into the power grid 15 by means of generator and power electronics 16. The pressure energy from the pressure storage devices 56, 57, 58 as well as the energy contained in the gases functioning as energy carriers are employed. The lost heat of the turbines 64 and also the residual heat in the combustion gases are returned via the heat exchangers 28 into the geothermal area 9 (see FIG. 3, FIG. 4) for storage purposes. Additional heat exchangers 28 connected to the cold water side 41, 42 enable also an emergency operation without the geothermal power plant part. Through valves 49 air and oxygen, for example, are preadjusted for optimal combustion before entering the internal combustion engines 64. In the intake area, for example, of a turbine 64 the fuel, for example, hydrogen or natural gas in a transition phase, is added. Instead of the turbine 64 it is also possible in principle to have other thermodynamic open-flow internal combustion engines such as piston, free piston and rotary piston engines. When using burners or catalytic heaters for utilizing the combustible gases, thermodynamic machines according to the Stirling concept or also steam motors with closed steam circuit can be implied. In all internal combustion engines and also when using burners or heaters, the exhaust of exhaust gases that pollute the environment, for example, $NO_x$, is unavoidable. Only by means of exhaust gas after treatment devices 65, by using additional energy, the produced harmful exhaust gases can be removed again.

In order to prevent harmful exhaust gases as a matter of principle, a further process is illustrated that produces electricity.

FIG. 12 shows an arrangement of expansion machines 63 in connection with high-pressure storage devices 51, 56, 57, 58 and low-pressure storage devices 52, 53 that, in turn, supply an arrangement of fuel cell devices 62. A mixing device 35 for gases comprising a pressure regulation optimizes the air or oxygen supply at the low-pressure side. The connection of a cooling device of the expansion machines 63 is not illustrated in order to simplify the drawing. It can be realized in principle as shown in FIG. 10. The conversion of an energy carrier, for example, hydrogen, into electricity by means of fuel cell 62, depending on the electrochemical process, can be performed in different temperature ranges. The following examples should be mentioned: membrane fuel cells (proton exchange membrane, PEM) for the temperature range of approximately 50° C. to 80° C.; direct methanol fuel cells (DMFC) for 80° C. to 130° C.; phosphoric acid fuel cell (PAFC) from 160° C. to 220° C.; carbonate melt fuel cells in the range of 640° C. Finally, there are even hot systems such as solid oxide fuel cells (SOFC) that operate in the temperature range of 800° C. to 1000° C. [11, page 30]. The waste heat of the fuel cell devices 62 is returned in the case of a suitable temperature level and/or appropriate design of the heat exchangers into the geothermal reservoir 9. The additionally introduced heat exchangers 28 at the cold water side 41, 42 enable again operation without the geothermal power plant part. When compressed air and/or compressed oxygen is available, the own energy-consuming air compression devices that are generally customary in fuel cell devices can be eliminated in the fuel cell devices 62. Fuel cell devices 62 in connection with the power electronics 18 can dynamically put out high power within a few seconds and are suitable therefore also for controlling and ensuring the quality of the electrical power grid (frequency, voltage, phase). Also known are fuel cells systems having a special configuration of the PEM cells that can operate also electrolytically in reverse and in this way produce, for example, hydrogen and oxygen when electricity is supplied. This can lead to a simplification of the electrolysis and fuel cell device because only components of the same type are used. Instead of the above described pressure vessels, depending on the geological conditions and the configuration of the system, it is also possible to use underground cavities 51. It should be mentioned also that large pressure vessels can also be installed in the ground. In large systems that handle gases, it is expedient to install for the low-pressure range and for the high-pressure range separate gas networks, respectively. By means of the devices for compression, expansion, pressure reduction, and pressure regulation, networks of the same gas at different pressure levels are connected with one another and enabled thus an optimal operation management.

Figure 13:
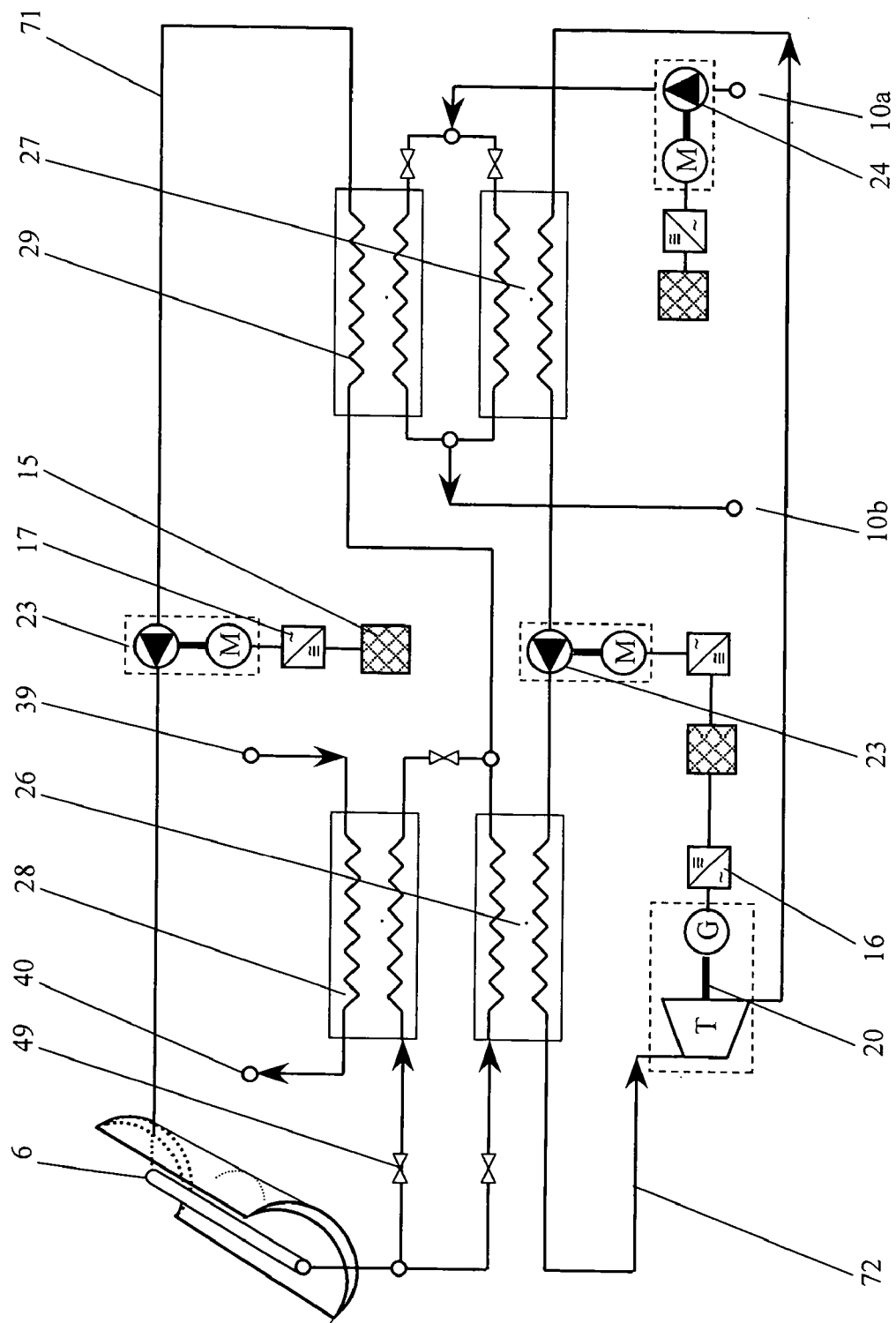
In FIG. 13 it is illustrated how in a parabolic trough power plant the heat can be supplied directly into a geothermal storage device. Finally.

Two additional concepts of an integrated geothermal power plant in connection with solar thermal devices are to be disclosed. In order to illustrate the possibility of a direct heat extraction from a solar thermal power plant FIG. 13 shows a basic diagram of a solar power plant with parabolic troughs 6. In the primary circuit 71 a second heat exchanger 28 is installed, for example, parallel to the steam generator 26. The illustrated secondary circuit 72 can be embodied differently than the secondary circuit of FIG. 3. The primary circuit 71 of the parabolic trough power plant 6 operates, for example, at a higher temperature level. The components, as illustrated in FIG. 13, are to be understood also as a partial process $A_i$ 31 and are therefore combined with the geothermal power plant by means of the indicated supply and return lines 39, 40. When the electrical load does not maximally utilize the generator of the parabolic trough power plant part 6, the excess heat energy is charged directly into the geothermal area 9 (FIG. 3). During the night and during periods of inclement weather, more energy can be removed from the geothermal storage device 9 and, in this way, the deficient amount of electricity that is produced by the solar thermal power plant part can be compensated.

The processes for thermal energy transfer occur rather slowly. In order to be able to react to sudden load changes in the electrical power grid, the compressed air storage device 51 with compression device 46 (FIG. 6) and expansion device 63 (FIG. 10) is required as a further partial process $A_{i+1}$ 31. The lost heat of compression can be transferred into the geothermal storage device 9 (FIG. 3) as described previously or can be supplied to the heat circuit 71 of the parabolic trough power plant by means of a heat exchanger that is switched, for example, parallel to 26 and/or 29 and/or in series to 26 and/or 29.

Figure 14:
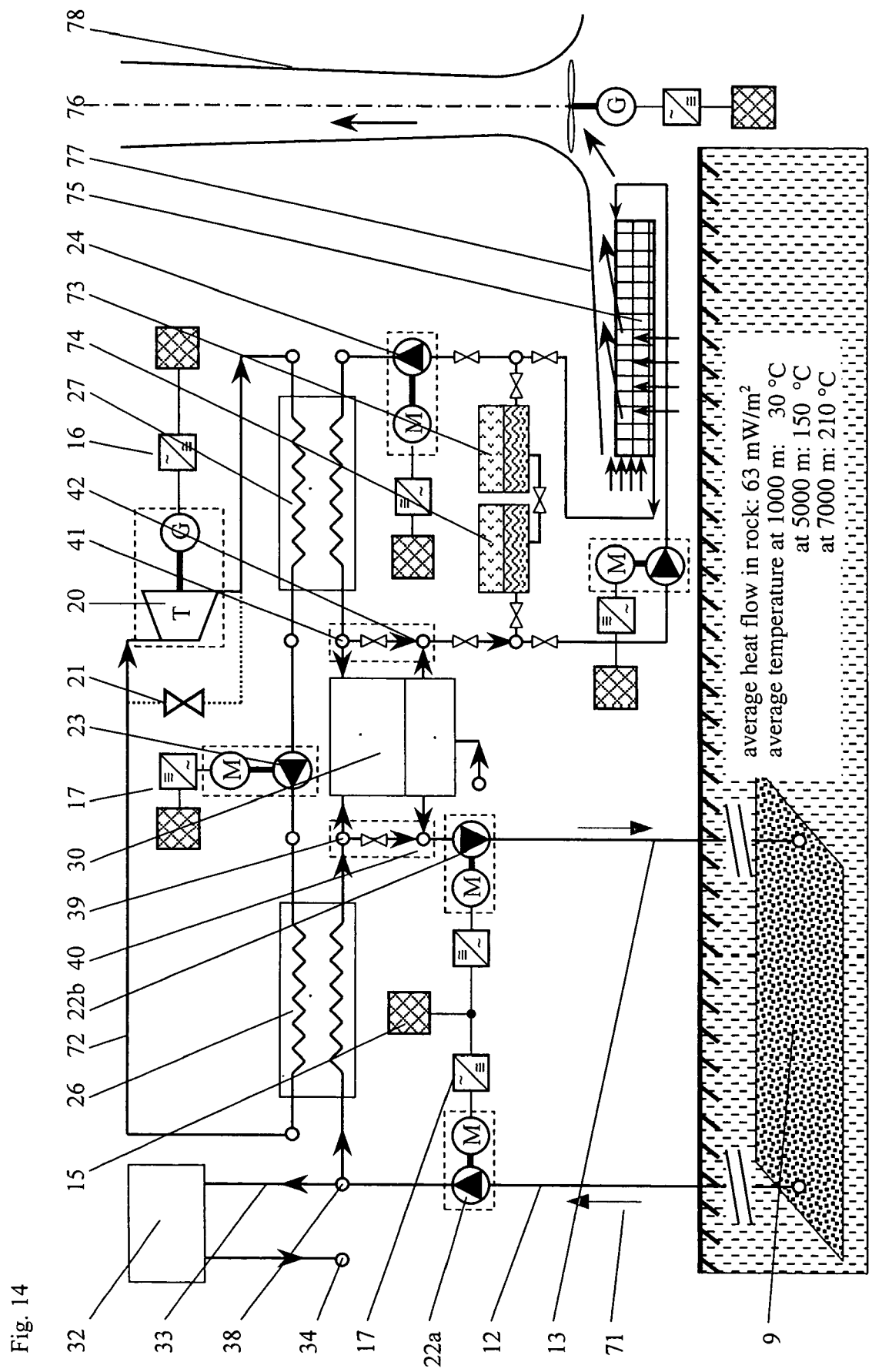
FIG. 14 shows how a limited cooling water reservoir of a geothermal power plant can be cooled by means of a solar chimney power plant.

FIG. 14 shows a power plant 1 that employs geothermal areas 9 in combination with a solar chimney power plant 76. Desert areas are present on the surface of the earth in large amounts and should be used for solar thermal energy extraction. Solar chimney power plants have been developed for desert areas because here they can be designed for a service life of at least 80 years and do not require water for cooling. In contrast, solar thermal power plants as well as geothermal power plants must be cooled with water. When only a single limited amount of water is available, the cooling circuit with the condenser 27 must be closed and it must be possible to transfer the energy to a sink at the lowest temperature level. A solar chimney power plant 76 generates a large throughput of air mass so that here the heat of the water circuit of the condenser 27 can be dissipated through the cooling networks 75 underneath the collector roof 77 of the solar chimney power plant. The chimney 78 of the solar chimney power plant guides the hot air upwardly. In approximately 1000 m altitude, the air will distribute and will cool down when doing so. In this connection, the air at 1000 m represents the required lowest temperature level.

As a result of the large solar radiation during daytime operation, the temperature level within the cooling networks 75 increases so that as a result of this the efficiency of the cooling devices 27, 75 and thus also of the thermal power plant will drop. It is expedient to install two storage reservoirs, a cold water reservoir 73 and a hot water reservoir 74, for example, for operation over a day. During the day the cold water flows from the reservoir 73 for cooling through the condenser 27 and is collected in the heated state in the hot water storage device 74. During the cold nighttime hours, the hot water from the storage device 74 can dissipate the heat of the daytime operation through the cooling networks 75 to the solar chimney power plant 76. This type of operation enables the solar chimney power plant 76 to increase, its production of electricity in nighttime operation.

Nighttime hours within one time zone are low-load or no-load times so that only little electricity is required. In contrast to a solar thermal power plant, a geothermal power plant could be operate within the counterclockwise thermodynamic cycle, i.e., as a heat pump. For this type of operation, the solar thermal power plant lacks the possibility of transferring energy through the mirrors to a second heat storage device and to use this energy at a later point in time.

With the excess electricity during nighttime operation the electrical drive of the supply pump 23 is supplied. The water, that has been heated by daytime operation and collected in the storage container 74, releases its heat during nighttime through the heat exchanger 27 to the secondary circuit 72 and through it to the heat exchanger 26. Through the lines 12, 13 by means of the electrical pump devices 17, 22a, 22b the heat is then transferred to the geothermal storage device 9. The quantity depends on the electrical energy that is supplied to the drive of the supply pump 23. Excess electricity can be used expediently in this way. Further details relating to heat pump operation are disclosed in the description of FIG. 3. For the processes A and B it is also possible to use all of the afore described processes.

During the day, the geothermal power plant operates again within the clockwise thermodynamic cycle for producing electricity. In this way, the combination of a geothermal power plant with a solar chimney power plant, as shown in FIG. 14, provides an advantage relative to a combination with a solar thermal power plant.

The advantage of coupling a solar chimney power plant with a geothermal power plant resides in that practically no water is consumed and within the geothermal power plant a storage operation is possible in order to utilize excess electricity.

After the description of the Figures, it should be underscored again that a geothermal area should be viewed primarily as a heat storage device with an initial filling. The operation of a geothermal power plant is to be carried out such that after a balancing period an energy contents has been generated again that corresponds to the initial heat energy state of the geothermal storage device. Accordingly, this reservoir at the installation location is still available to our future generations for utilization. In the following, the operation of an integrated geothermal energy conversion plant (IGEC) is to be discussed in detail.

A geothermal storage device is to be operated such that the heat energy balance within a normal year is compensated;

additional heat is removed from the storage device within a year of minimal availability of fluctuating renewable forms of energy, such as wind, ocean wave or solar energy, in order to fulfill supply demands;

in a year with excess supply of renewable forms of energy for compensation of the additional removal during energy-poor years such excess is supplied to the storage device;

heat removal is compensated for several years of low energy production of other regenerative sources but across a longer period of time (for example, 5 to 10 years) the heat balance is balanced again.

Similar to a pump storage device the above described system concept can now fulfill the following tasks:

taking up excess energy during low demand times and returning energy into the electrical power grid during times of peak load;

providing momentarily usable reserve power (increase of the operational safety within the power system);

using excess electricity of the base load range of conventional power plants in order to enable continuous operation of a heat power plant without a limitation by using a power control; this enables the expansion of the operating time with constant power output of fossil thermal power plants which leads to a reduction of the employed fuels and of the $CO_2$ emission per electrical energy unit;

maintaining the power grid quality by control of power, frequency, and voltage.

Based on the plurality of possibilities of the concept of an integrated geothermal power plant, the following combinations are especially interesting at the moment:

wind power devices connected to a geothermal power plant (IGEC) with underground compressed air storage devices and compression devices, in combination with expansion turbines without/with combustion, in transition phases also with natural gas and methane hydrate combustion, later hydrogen operation from a $H_2$ gas network, in combination with heat recovery and heat storage in deep underground;

wind power devices connected to a geothermal power plant (IGEC) with electrolysis device and underground compressed air storage devices for air, hydrogen and oxygen gases, and subsequent production of electricity by gas-fueled combustion turbines or, in the future, by fuel cell devices, both variants with recovery of the lost heat and its storage in deep underground.

Despite the minimal overall efficiency of the entire chain from the storage device to regenerating the electrical current, this concept and its operation should be viewed as a possibility for energy upgrading. For peak load electricity, it is possible to gain revenues several times that of the reinbursement guaranties specified by law for supplying renewable energy into the power grid. Now that the markets for electricity have been opened and the influence of monopolists has been reduced more and more, this electricity can be sold on the electricity market also at a good price. The integrated geothermal energy conversion plant (IGEC) with its capability for energy storage therefore represents a significant element in the energy industry using regenerative sources.

Even for greater power plant units the character of a decentralized energy supply remains intact for the integrated geothermal energy conversion plant (IGEC) because the heat utilization on site is limited and, while power plant sizes up to several hundred MW are possible, 1 GW units as in the field of nuclear power plants cannot be achieved.

It should be realized that the fossil energy industry currently has installed industrial facilities of huge dimensions on our oceans. In the North Sea alone there are more than 400 devices of the oil and natural gas industry. The negative results of drilling platforms and tanker accidents can be found unfortunately too often in the newspapers. Also, in the past it has been attempted to sink old facilities in the ocean which would represent an unfathomable waste of resources and a legacy of waste dumps in the oceans for future generations.

Moreover, the use of drinking water in the context of energy industry should become less and less commonplace. Nuclear power plants and also the conventional fossil-fueled power plants require water for cooling or consume indirectly large amounts of important groundwater because of extraction of coal. This water is needed increasingly for foodstuff production and as a vital provision in itself. On the other hand, salty sea water is present in large quantities. When a technical process requires pure water, this water must be produced by processing. The costs of this must be recovered by the product that is sold. Nuclear power plants and fossil power plants externalize, in addition to the $CO_2$ emission and final storage of radioactive materials, also these costs; this is equivalent to a permanent subsidy.

The presented concepts of IGEC devices are also suitable for installation locations on or in shallow seas. The already present oil and natural gas boreholes can be optionally used further in order to penetrate into depths that allow economic utilization of a geothermal area. Optionally, the areas depleted of fossil fuels in shallow seas can be used in the future as compressed gas storage devices. It is also conceivable in this connection to utilize marginal fossil energy deposits in connection with compressed gas storage devices in other caverns that have already been emptied. The excess electricity of offshore wind turbines is used for the compression. The waste heat of compression and gas-fueled combustion turbine devices is supplied to the geothermal storage device so that this heat is at least partially reusable. In parallel, at other locations the construction and operation of electrolysis devices for hydrogen and oxygen can be started. With appropriate properties of the underground, the hydrogen can also be stored in the areas depleted of natural gas. In a transition period in which hydrogen and fossil gases such as natural gas and methane hydrate coexist in sufficient amounts, hydrogen or synthetic gas and fossil gas, at the right mixing ratio, can be combusted together in the same turbine. As a result of the close relationship of methanol and fossil fuels it is also possible to use ocean-technological devices of the oil industry as storage devices for methanol. Methanol can be produced synthetically by using regenerative sources. The required carbon (for example algae, $CO_2$ dissolved in water, air) can be taken from the environment of the devices. Also, synthetic fuel gas as in the biogas devices on land can be produced and utilized.

It is also possible to employ already present platforms of oil and natural gas storage devices, after retrofitting, as a power plant or storage device even before they are returned to land for disposal and recovery in material recycling. The "second life" of such devices enables a more efficient economical utilization of the already spent capital.

The increasing industrialization of the oceans, beginning with the shallow seas at our coasts may appear frightening. But devices that employ regenerative energies require space, large installation areas, and also water; these conditions are no longer available in densely populated areas. Therefore, locations on or in the ocean increasingly gain importance. It is decisive wether a device meets the requirements with regard to environmentally friendly construction and removal and also with regard to environmetally friendly operation. The employed processes are to be selected and developed with this in mind.

Today, the described variants of the integrated geothermal energy conversion IGEC can be easily simulated on computers. It is possible to select device and operating concepts according to economic criteria and to adjust them to the conditions on site. Power plants of several hundred MW are possible and represent an alternative to nuclear and fossil concepts.

LIST OF REFERENCE NUMERALS 1 power plant building with all the system components
2 support structure, anchored to the bottom of a body of water
3 energy transfer by heat medium or electric current
4 heat or electric energy from onshore regenerative sources
5 heat or electric energy from regenerative sources in offshore area
6 collectors for solar thermal energy, e.g., mirror systems like parabolic troughs
7 wind energy devices
8 ocean wave convertor
9 geothermal energy storage device, geothermal area
10 10a water inlet
10b water outlet
11 connecting pipes to underground compressed gas storage device
12 connecting pipes from geothermal energy storage device: production line
13 connecting pipes to geothermal storage device: injection line
14 protective insulation of connecting pipes 13, 14 against heat loss upon passing through a body of water
15 electric direct current or alternating current power grid
16 power electronics of an electrical machine primarily for generator operation
17 power electronics of an electrical machine primarily for motor operation
18 power electronics for rectifier, invertor, and frequency inverter operation for adaptation to different voltage levels and voltage types
19 electrical heating elements
20 turbine with generator and devices for removal of lost heat
21 expansion valve
22 22a water pumps for production lines
22b water pumps for injection lines
23 supply pump for working medium
24 water pump
25 vacuum pump
26 heat exchanger, primarily operated as evaporator
27 heat exchanger, primarily operated as condenser
28 heat exchanger, primarily for heat removal
29 heat exchanger, primarily for heat supply
30 process A taking up heat or releasing heat
31 partial process $A_i$ taking up heat or releasing heat
32 process B taking up heat or releasing heat 33 heat supply by transfer medium for process B
34 heat removal by transfer medium from process B
35 mixing device for gaseous media
36 mixing device for liquid heat transfer media
37 37a total supply for heat transfer medium, hot water side
   37b total supply for heat transfer medium, cold water side
38 branching device in pipeline for heat transfer medium
39 inlet for heat transfer medium, hot water side
40 outlet for heat transfer medium, hot water side
41 inlet for heat transfer medium, cold water side
42 outlet for heat transfer medium, cold water side
43 collecting device for heat transfer medium
44 44a total return for heat transfer medium, hot water side
   44b total return for heat transfer medium, cold water side
45 gas compressor with devices for removing the lost heat
46 gas compressor for air
47 gas compressor for hydrogen
48 gas compressor for oxygen
49 control and regulating valve devices
50 pressure retaining device, for example, check valve
51 compressed gas storage device, underground cavity or pressure vessel
52 compressed gas storage device for hydrogen in the low-pressure range
53 compressed gas storage device for oxygen in the low-pressure range
54 converter devices for utilizing ocean current
55 compressed air storage device in high-pressure range
56 compressed air storage device for hydrogen in high-pressure range
57 compressed air storage device for oxygen in high-pressure range
58 compressed air storage device for air in high-pressure range
59 exhaust air or exhaust gas device, also with filtering devices
60 electrolysis devices with devices for removal of lost heat
61 devices for a process converting generally energy
62 fuel cell devices with devices for removing the lost heat
63 expansion turbines for pressure expansion with heat exchangers
64 internal combustion engines with heat exchangers for removal of lost heat
65 devices for exhaust gas after treatment
66 gas removal device
67 device for removal of desalinated water
68 return for salt water
69 water surface
70 bottom of body of water, ocean bottom
71 primary working medium or cooling medium circuit
72 secondary working medium or cooling medium circuit
73 cooling water supply in closed container
74 hot water supply in closed container
75 cooling networks for exchange of heat with the environment
76 solar chimney power plant
77 collector roof of the solar chimney power plant
78 chimney of the solar chimney power plant Power Plant System for Utilizing the Heat Energy of Geothermal Reservoirs

LIST OF LITERATURE CITATIONS

[1] Maritime Kraftwerksanlage mit Herstellungsprozeß zur Gewinnung, Speicherung und zum Verbrauch von regenerativer Energie; T. Pflanz, in: Proceedings, PE2.5, The World Wind Energy Conference and Exhibition, Berlin, Jul. 2–6, 2003, ISBN 3-936338-11-6; CD-ROM, Organizer: WIP-Munich in Munich.

[2] Patent documents:

[2.1] DE 197 14 512, Maritime Kraftwerksanlage mit Herstellungsprozeß zur Gewinnung, Speicherung und zum Verbrauch von regenerativer Energie

[2.2] U.S. Pat. No. 6,100,600; Maritime Power Plant System with Processes for Producing, Storing, and Consuming Regenerative Energy

[3] Wasserstoff als Energieträger; published by Winter Nitsch, Springer Verlag, Berlin, Heidelberg, New York, Tokyo, 1986

[4] The following articles are taken from: Tagungsband 2000, Siebentes Kasseler Symposium Energie-Systemtechnik, published by Institut für Solare Energieversorgungstechnik (ISET) Verein an der Universität Kassel e.V.

[4, pages 26ff] Druckluftspeicher-Gasturbinen-Kraftwerke/ Geplanter Einsatz beim Ausgleich fluktuierender Windenergie-Produktion und aktuellem Stormbedarf, Fritz Crotogino

[4, pages 105ff] Einsatz von Superkondensatoren in Kraftfahrzeugen, Rainer Knorr, Siemens VDO, Automotive AG, Regensburg

[4, pages 162ff] Supraleitende Magnetische Energiespeicher, Dr. Klaus-Peter Juengst, Forschungszentrum Karlsruhe

[4, pages 178ff] Schwungradspeicher—Stand der Technik, Dr. Frank Täubner, rosseti Technik GmbH, Roßlau

[5] Silizium—Der neue Wasserstoff? Norbert Auner, in: Tagungsband 2001, Sechstes Kasseler Symposium Energie-Systemtechnik, published by Institut für Solare Energieversorgungstechnik (ISET) Verein an der Universität Kassel e.V.

[6] DE 101 21 475 A1 Verfahren zur Energieerzeugung

[7] Energie aus Erdwärme, published by Martin Kaltschmitt, Ernst Huenges, Helmut Wolff, Deutscher Verlag für Grundstoffindustrie, Stuttgart, 1999

[8] 20 Jahre Tiefe Geothermie in Deutschland, Tagungsband, 7. Geothermische Fachtagung, Nov. 6–8, 2002, in Waren (Müritz)

[9] Energie, K. Heinloth, TeubnerVerlag, Stuttgart, 1983

[10] Renewable Energy from the Ocean, a guide to OTEC, William H. Avery, Chih Wu, Oxford University Press, New York, Oxford, 1994

[11] Brennstoffzellen, Entwicklung, Technologie, Anwendung, Konstantin Ledjeff (Publisher), C. F. Müller Verlag GmbH, Heidelberg, 1st edition, 1995

[12] DE 198 21 659 A1 Aufwindkraftwerk in Verbindung mit solarthermischen Kraftwerken

What is claimed is:

1. A geothermal power plant system for producing electricity and process heat, the geothermal power plant comprising:
   at least one compressed gas storage device;
   at least one gas compression device connected to the at least one compressed gas storage device for supplying compressed gas to the at least one compressed gas storage device;
   at least one gas utilization device connected to the at least one compressed gas storage device for utilizing the energy stored in the compressed gas; and
   at least one heat exchanging device for returning waste heat of the at least one gas compression device and process heat of the at least one gas utilization device into the geothermal area for recharging the geothermal area.

2. The geothermal power plant system according to claim 1, comprising at least one device for utilizing renewable energy selected from the group consisting of solar energy, wind energy, hydropower, ocean thermal energy, ocean waves, ocean current and tidal current, ambient heat or cold.

3. The power plant system according to claim 1, comprising at least one heat exchanging device for extracting heat from the geothermal area and at least one heat exchanging device for returning process heat of at least one energy-converting process of the power plant system into the geothermal area.

4. The power plant system according to claim 1, installed at the water or on a support structure in the water.

5. The power plant system according to claim 1, comprising connecting lines for exchange and transport of heat from and to the geothermal area, wherein the connecting lines are provided with heat insulation against heat loss when passing through a body of water.

6. The power plant system according to claim 1, wherein the geothermal reservoir is developed by the hot dry rock method.

7. The power plant system according to claim 1, wherein the geothermal reservoir is developed by aquifers or by boreholes or probes.

8. The power plant system according to claim 1, wherein several geothermal areas at one installation site are connected for utilization by at least two supply lines either individually or several simultaneously or alternatingly.

9. The power plant system according to claim 1, comprising a secondary circuit that comprises an easily evaporating working medium for driving by means of a heat exchanger as an evaporator at least one turbine with generator for producing electricity and comprising at least one additional heat exchanger as a condenser and at least one supply pump for circulating the working medium in at least one single-stage clockwise thermodynamic cycle.

10. The power plant system according to claim 1, wherein the same devices, comprised of a turbine with electric machine, a supply pump, and heat exchangers, are arranged for an at least single-stage counterclockwise thermodynamic cycle selected from the group consisting of heat pump operation or cooling device operation.

11. The power plant system according to claim 1, wherein for generating electricity by utilizing the geothermal heat at least one heat exchanger as an evaporator with underpressure devices is provided, wherein in an open circulation water as a working medium is used for driving at least one turbine with generator, at least one condenser with underpressure devices and water pumps for supply operated in a clockwise thermodynamic cycle.

12. The power plant system according to claim 1, wherein at least one Stirling machine in connection with at least one electrical machine is provided between a hot water side and a cold water side and wherein the at least one Stirling machine and the at least one electrical machine are operated in a clockwise thermodynamic cycle for producing electricity or in a counterclockwise cycle as a heat pump.

13. The power plant device according to claim 1, wherein the at least one compressed gas storage device is an underground cavity that in the soil is surrounded completely by sediment, rock or salt or by other materials found in the ground.

14. The power plant system according to claim 1, wherein the at least one compressed gas storage device is a pressure vessel for compressed gases.

15. The power plant system according to claim 1, wherein the at least one compression device is provided with devices for recovering lost heat of compression.

16. The power plant system according to claim 1, further comprising at least one pressure expansion device in the form of a turbine with generator for producing electricity with devices for introducing expansion heat and/or recovering lost heat.

17. The power plant system according to claim 1, wherein, aside from pressure of a compressed gas, the energy content of the gas is utilized by an expansion device with combustion in the form of a turbine with electric generator and with devices for recovering lost heat.

18. The power plant system according to claim 1, wherein devices are provided in order to receive, after gas expansion from a storage device in the high-pressure range, the gas in a low-pressure storage device.

19. The power plant system according to claim 18, wherein for manipulating the different gases individual gas networks for a gas are installed for the low-pressure range and for the high-pressure range, respectively, to which are connected compression devices, expansion devices, regulating devices, and storage devices.

20. The power plant system according to claim 1, wherein for gas production at least one electrolysis device for producing hydrogen and oxygen is provided.

21. The power plant device according to claim 1, further comprising devices for liquefaction of gas such as hydrogen or oxygen or ammonia or air.

22. The power plant system according to claim 1, further comprising at least one fuel cell device in combination with power electronics for generating electricity with devices for recovering lost heat.

23. The power plant system according to claim 1, wherein as an energy sink electrical heaters with heat recovery in combination with simple switching technology or with power electronics are provided for regulating overproduction of electricity.

24. The power plant system according to claim 1, further comprising as very fast storage devices magnetic, electric or magneto-electric components, selected from the group consisting of coils, capacitors, and electric flywheel storage devices, or rechargeable batteries with and without power electronics.

25. The power plant system according to claim 1, further comprising devices for water desalination and water processing by distillation or electrodialysis or reverse osmosis.

26. The power plant system according to claim 1, further comprising at least one cooling water circuit with circulating pumps and with at least one cooling network that is in communication with at least one water reservoir.

27. The power plant system according to claim 26, further comprising a solar chimney power plant for cooling the cooling networks for the required mass flow of air.

* * * * *